US012259673B1

(12) United States Patent
Oyamada et al.

(10) Patent No.: US 12,259,673 B1
(45) Date of Patent: Mar. 25, 2025

(54) IMAGE FORMING APPARATUS

(71) Applicant: FUJIFILM Business Innovation Corp., Tokyo (JP)

(72) Inventors: Yuki Oyamada, Kanagawa (JP); Kenta Ide, Kanagawa (JP); Masahiro Iwasaki, Kanagawa (JP); Yoichi Kigoshi, Kanagawa (JP); Keisuke Kusano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/581,389

(22) Filed: Feb. 20, 2024

(30) Foreign Application Priority Data

Sep. 20, 2023 (JP) ................................ 2023-152503

(51) Int. Cl.
*G03G 15/00* (2006.01)
*G03G 5/06* (2006.01)
(Continued)

(52) U.S. Cl.
CPC ........... *G03G 15/75* (2013.01); *G03G 5/0651* (2013.01); *G03G 15/0194* (2013.01);
(Continued)

(58) Field of Classification Search
CPC ............. G03G 5/0651; G03G 15/0194; G03G 15/0216; G03G 15/75; G03G 15/751; G03G 15/752
See application file for complete search history.

(56) References Cited

U.S. PATENT DOCUMENTS 6,110,629 A * 8/2000 Ehara ..................... G03G 5/104 430/84
6,122,467 A * 9/2000 Ehara ..................... G03G 5/104 399/174
(Continued)

FOREIGN PATENT DOCUMENTS

| | | |
|---|---|---|
| CN | 116774539 | 9/2023 |
| JP | H0588393 | 4/1993 |

(Continued)

OTHER PUBLICATIONS

"Search Report of Europe Counterpart Application", issued on Aug. 26, 2024, p. 1-p. 8.

*Primary Examiner* — Joseph S Wong
(74) *Attorney, Agent, or Firm* — JCIPRNET

(57) ABSTRACT

An image forming apparatus includes an electrophotographic photoreceptor that includes a conductive substrate, an undercoat layer provided on the conductive substrate, containing a binder resin and an electron transport material, and satisfying Expression 1-1, and a photosensitive layer provided on the undercoat layer, a charging device that charges a surface of the electrophotographic photoreceptor, an electrostatic latent image forming device that forms an electrostatic latent image on the charged surface of the electrophotographic photoreceptor, a developing device that develops the electrostatic latent image formed on the surface of the electrophotographic photoreceptor with a developer containing a toner to form a toner image, and a transfer device that transfers the toner image to a surface of a recording medium, in which a moving time of an outer peripheral surface of the electrophotographic photoreceptor, required from charging performed by the charging device to development performed by the developing device, is 90 msec or longer, (Continued)

Expression 1-1: $0.20 \leq E_{F1} - E_{LUMO1} \leq 0.60$ (in Expression 1-1, $E_{F1}$ represents a Fermi level of the undercoat layer, and $E_{LUMO1}$ represents an energy level of LUMO of the undercoat layer).

10 Claims, 2 Drawing Sheets

(51) Int. Cl.
*G03G 15/01* (2006.01)
*G03G 15/02* (2006.01)

(52) U.S. Cl.
CPC ....... *G03G 15/0216* (2013.01); *G03G 15/751* (2013.01); *G03G 15/752* (2013.01)

(56) References Cited

U.S. PATENT DOCUMENTS

| | | | | |
|---|---|---|---|---|
| 11,036,151 | B2 | 6/2021 | Kitagawa et al. | |
| 2020/0225594 | A1 * | 7/2020 | Kitagawa ............. | G03G 5/0668 |
| 2020/0301295 | A1 | 9/2020 | Maki et al. | |
| 2023/0333493 | A1 | 10/2023 | Oyamada et al. | |

FOREIGN PATENT DOCUMENTS

| | | |
|---|---|---|
| JP | 2001356613 | 12/2001 |
| JP | 4903597 | 3/2012 |
| JP | 2014066755 | 4/2014 |
| JP | 7004011 | 1/2022 |

* cited by examiner

IMAGE FORMING APPARATUS

CROSS-REFERENCE TO RELATED APPLICATIONS

This application is based on and claims priority under 35 USC 119 from Japanese Patent Application No. 2023-152503 filed Sep. 20, 2023.

BACKGROUND

(i) Technical Field

The present invention relates to an image forming apparatus.

(ii) Related Art

JP1993-088393A discloses a negatively charged organic lamination type electrophotographic photoreceptor, in which in a case where a work function of a conductive support is defined as Wsub, a work function of an undercoat layer is defined as WUCL, and a work function of a charge generation layer is defined as WCGL in the lamination type photoreceptor formed by sequentially laminating an undercoat layer, a charge generation layer, and a charge transport layer on a conductive support, a relationship of (WUCL−Wsub)>0.6 or (WCGL−WUCL)>0.6 is satisfied, and the undercoat layer has a film thickness of 2 μm or greater and 20μ or less.

JP7004011B discloses an in an electrophotographic photoreceptor including a conductive substrate and a photosensitive layer provided on the conductive substrate, in which the photosensitive layer includes a charge transport layer and a charge generation layer sequentially laminated on the conductive substrate, the charge transport layer contains a first positive hole transport material and a resin binder, the charge generation layer contains a charge generation material, a second positive hole transport material, an electron transport material, and a resin binder, the charge generation material is metal-free phthalocyanine or titanyl phthalocyanine, the electron transport material includes first and second electron transport materials, a difference between the energy of LUMO of the first electron transport material and the energy of LUMO of the charge generation material is in a range of 1.0 to 1.5 eV, a difference between the energy of LUMO of the second electron transport material and the energy of LUMO of the charge generation material is in a range of 0.6 to 0.9 eV, and a proportion of a content of the second electron transport material in a content of the first electron transport material and the second electron transport material is in a range of 3% to 40% by mass.

JP2014-066755A discloses an electrophotographic photoreceptor including a conductive support, an undercoat layer that contains metal oxide particles and an electron-accepting compound having an anthraquinone structure and has a volume resistivity of $3.5\times10^{8}$ Ω·m or greater and $1.0\times10^{9}$ Ω·m or less, which is measured by an alternating current impedance method, and photosensitive layers in this order, and a difference (|EfP|−|EfU|) between the Fermi energy (EfP) of the layer closest to the undercoat layer among the photosensitive layers and the Fermi energy (EfU) of the undercoat layer is 0.55 eV or greater and 0.75 eV or less.

SUMMARY

In a case where an image is formed on thick paper using an image forming apparatus of the related art, the thick paper has low heat conduction and thus tends to require a long time for image fixation. Therefore, the rotation speed of the electrophotographic photoreceptor is decreased, and the time required from charging to development tends to be long. As a result, the charge retention power is decreased, and thus a phenomenon in which a toner adheres to a non-image area of a recording medium (hereinafter, referred to as "fogging") may be observed. Aspects of non-limiting embodiments of the present disclosure relate to an image forming apparatus that includes an electrophotographic photoreceptor including a conductive substrate, an undercoat layer containing a binder resin and an electron transport material, and a photosensitive layer and in which a moving time of an outer peripheral surface of the electrophotographic photoreceptor, required from charging performed by a charging device to development carried out by a developing device, is 90 msec or longer, and fogging is suppressed as compared with a case where the undercoat layer does not satisfy Expression 1-1 (that is, the value of $E_{F1}-E_{LUMO1}$ is less than 0.20 or greater than 0.60).

Expression 1-1: $0.20\leq E_{F1}-E_{LUMO1}\leq0.60$ (in Expression 1-1, $E_{F1}$ represents a Fermi level of the undercoat layer, and $E_{LUMO1}$ represents an energy level of LUMO of the undercoat layer.)

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Specific means for achieving the above-described object includes the following aspects.

According to an aspect of the present disclosure, there is provided an image forming apparatus including: an electrophotographic photoreceptor that includes a conductive substrate, an undercoat layer provided on the conductive substrate, containing a binder resin and an electron transport material, and satisfying Expression 1-1, and a photosensitive layer provided on the undercoat layer; a charging device that charges a surface of the electrophotographic photoreceptor; an electrostatic latent image forming device that forms an electrostatic latent image on the charged surface of the electrophotographic photoreceptor; a developing device that develops the electrostatic latent image formed on the surface of the electrophotographic photoreceptor with a developer containing a toner to form a toner image; and a transfer device that transfers the toner image to a surface of a recording medium, in which a moving time of an outer peripheral surface of the electrophotographic photoreceptor, required from charging performed by the charging device to development performed by the developing device, is 90 msec or longer, Expression 1-1: $0.20\leq E_{F1}-E_{LUMO1}\leq0.60$ (in Expression 1-1, $E_{F1}$ represents a Fermi level of the undercoat layer, and $E_{LUMO1}$ represents an energy level of LUMO of the undercoat layer).

BRIEF DESCRIPTION OF THE DRAWINGS

Exemplary embodiment(s) of the present invention will be described in detail based on the following figures, wherein.

DETAILED DESCRIPTION

Figure 1:
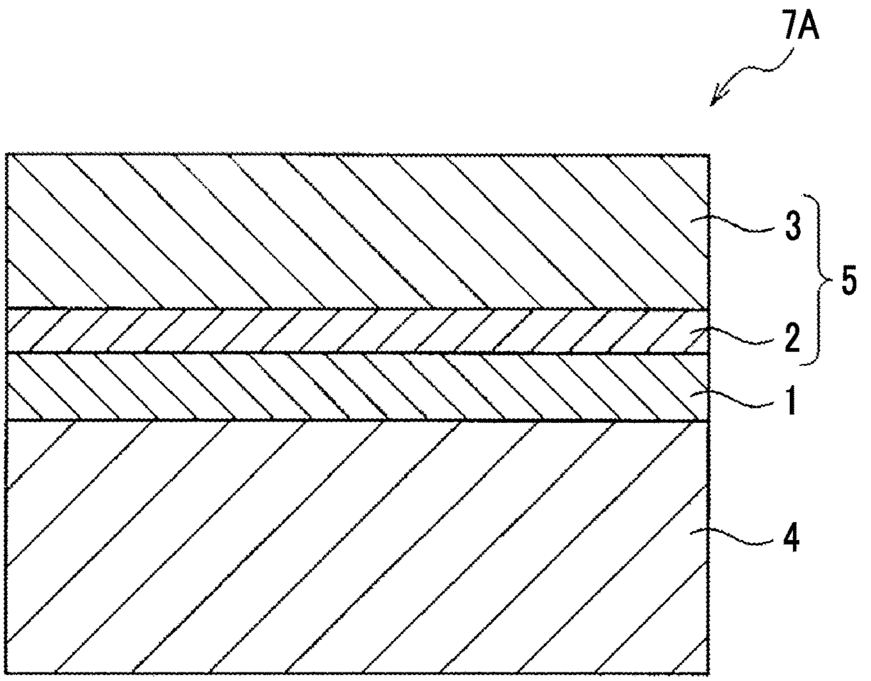
FIG. 1 is a schematic partial cross-sectional view showing an example of a layer configuration of an electrophotographic photoreceptor according to the present exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, the meaning of the term "step" includes not only an independent step but also a step whose intended purpose is achieved even in a case where the step is not clearly distinguished from other steps.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, the main component denotes a major component. In the present specification, the main component denotes a component that occupies 30% by mass or greater of the total mass of a mixture obtained by mixing a plurality of kinds of components.

In the present disclosure, an electrophotographic photoreceptor is also simply referred to as a photoreceptor.

Electrophotographic Photoreceptor

An image forming apparatus according to the present exemplary embodiment is an image forming apparatus including an electrophotographic photoreceptor that includes a conductive substrate, an undercoat layer provided on the conductive substrate, containing a binder resin and an electron transport material, and satisfying Expression 1-1, and a photosensitive layer provided on the undercoat layer, a charging device that charges a surface of the electrophotographic photoreceptor, an electrostatic latent image forming device that forms an electrostatic latent image on the charged surface of the electrophotographic photoreceptor, a developing device that develops the electrostatic latent image formed on the surface of the electrophotographic photoreceptor with a developer containing a toner to form a toner image, and a transfer device that transfers the toner image to a surface of a recording medium, in which a moving time of an outer peripheral surface of the electrophotographic photoreceptor, required from charging performed by the charging device to development performed by the developing device, is 90 msec or longer.

$$0.20 \leq E_{F1} - E_{LUMO1} \leq 0.60 \qquad \text{Expression 1-1:}$$

(In Expression 1-1, $E_{F1}$ represents a Fermi level of the undercoat layer, and $E_{LUMO1}$ represents an energy level of LUMO of the undercoat layer.)

FIG. 1 schematically shows an example of a layer configuration of the electrophotographic photoreceptor in the image forming apparatus according to the present exemplary embodiment. A photoreceptor 7A shown in FIG. 1 has a structure in which an undercoat layer 1, a charge generation layer 2, and a charge transport layer 3 are laminated in this order on a conductive substrate 4. The charge generation layer 2 and the charge transport layer 3 constitute a photosensitive layer 5. The photoreceptor 7A may have a layer configuration in which a protective layer is further provided on the charge transport layer 3.

In the photoreceptor according to the present exemplary embodiment, the photosensitive layer may be a function separation type photosensitive layer in which the charge generation layer 2 and the charge transport layer 3 are separated as in the photoreceptor 7A shown in FIG. 1 or may be a single layer type photosensitive layer having a charge generation ability and a charge transport ability in place of the charge generation layer 2 and the charge transport layer 3.

In recent years, as a printing target using electrophotography, there has been an increasing demand for printing not only on plain paper but also on thick paper such as postcards and paper used as an advertising medium. In a case where an image is formed on thick paper using an electrophotographic photoreceptor, heat transfer tends to be slower than the heat transfer of plain paper. Therefore, more time is likely to be required for fixation. As a result, an electrophotographic photoreceptor of the related art is required to set the rotation speed to be low as the fixation time increases. Meanwhile, in a case where the rotation speed of the electrophotographic photoreceptor is decreased (specifically, the moving time of the outer peripheral surface of the electrophotographic photoreceptor, required from charging performed by the charging device to development performed by the developing device is 90 msec or longer), it takes a longer time from the charging to the development, and thus the charge retention power is likely to be decreased. As a result, the electrophotographic photoreceptor of the related art may cause image defects such as fogging in a case where the rotation speed is low.

Further, in the electrophotographic photoreceptor of the image forming apparatus according to the present exemplary embodiment, the undercoat layer satisfies Expression 1-1: $0.20 \leq E_{F1} - E_{LUMO1} \leq 0.60$ (in Expression 1-1, $E_{F1}$ represents a Fermi level of the undercoat layer, and $E_{LUMO1}$ represents an energy level of LUMO of the undercoat layer). That is, "$E_{F1} - E_{LUMO1}$" is suppressed to be small as appropriate. Therefore, accumulation of the energy barrier at the interface between the undercoat layer and the charge generation layer is likely to be suppressed. As a result, it is considered that fogging of an image can be suppressed even in a case where the rotation speed of the electrophotographic photoreceptor is low.

In the image forming apparatus according to the present exemplary embodiment, the moving time of the outer peripheral surface of the electrophotographic photoreceptor, required from charging performed by the charging device to development performed by the developing device, is 90 msec or longer, and may be 95 msec or longer and 300 msec or shorter or 95 msec or longer and 250 msec or shorter. The image forming apparatus according to the present exemplary embodiment suppresses fogging of an image because $E_{F1} - E_{LUMO1}$ is suppressed to be small as appropriate even in a case where the moving time of the outer peripheral surface of the electrophotographic photoreceptor is 90 msec or longer, and accumulation of the energy barrier at the interface between the undercoat layer and the charge generation layer is suppressed.

Figure 2:
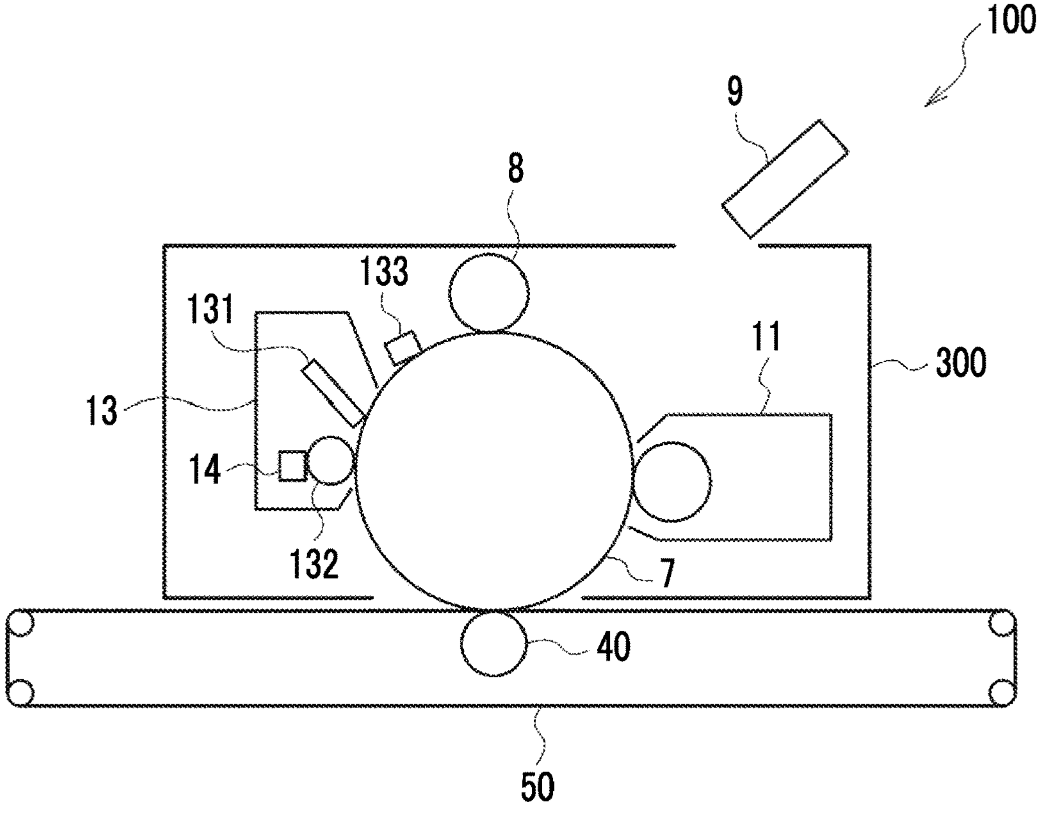
FIG. 2 is a schematic configuration view showing an example of an image forming apparatus according to the present exemplary embodiment.

The expression "from charging performed by the charging device to development performed by the developing device" denotes a time period from the starting time of charging by the charging device to the time at which a toner image is formed by the developing device in a case where the image forming apparatus shown in FIG. 2 is employed as the configuration of the image forming apparatus.

The undercoat layer satisfies Expression 1-1, for example, preferably Expression 1-2, and more preferably Expression 1-3. In a case where the following expression is satisfied, $E_{F1}-E_{LUMO1}$ is suppressed to be small as appropriate. Therefore, the accumulation of the energy barrier is likely to be suppressed at the interface between the undercoat layer and the charge generation layer. As a result, fogging of an image is further suppressed even in a case where the rotation speed of the electrophotographic photoreceptor is low.

$$0.20 \leq E_{F1}-E_{LUMO1} \leq 0.60 \quad \text{Expression 1-1:}$$

$$0.40 \leq E_{F1}-E_{LUMO1} \leq 0.58 \quad \text{Expression 1-2:}$$

$$0.45 \leq E_{F1}-E_{LUMO1} \leq 0.58 \quad \text{Expression 1-3:}$$

In Expressions 1-1, 1-2, and 1-3, $E_{F1}$ represents the Fermi level of the undercoat layer, and $E_{LUMO1}$ represents the energy level of LUMO of the undercoat layer.

The undercoat layer has, for example, a Fermi level $E_{F1}$ of preferably 4.20 eV or greater and 5.00 eV or less, more preferably 4.20 eV or greater and 4.70 eV or less, and still more preferably 4.30 eV or greater and 4.50 eV or less. In a case where the Fermi level $E_{F1}$ is in the above-described ranges, an increase in $E_{F1}-E_{LUMO1}$ can be suppressed to be small as appropriate.

The Fermi level $E_{F1}$ of the undercoat layer is measured as follows.

The electrophotographic photoreceptor is cut into a size of 2 cm square, and the charge generation layer and the charge transport layer are removed by using a solvent such as THF such that the electrophotographic photoreceptor is formed of only the conductive substrate and the undercoat layer. Subsequently, the outer peripheral surface of the undercoat layer is measured by a Kelvin probe method using a Fermi level measuring instrument (FAC-2, manufactured by RIKEN KEIKI Co., Ltd.).

The undercoat layer has, for example, a LUMO energy level $E_{LUMO1}$ of preferably 3.50 eV or greater and 4.20 eV or less, more preferably 3.60 eV or greater and 4.10 eV or less, and still more preferably 3.70 eV or greater and 4.00 eV or less. In a case where the $E_{LUMO1}$ is in the above-described ranges, an increase in $E_{F1}-E_{LUMO1}$ is suppressed to be small as appropriate.

The energy level $E_{LUMO1}$ of the LUMO of the undercoat layer is measured as follows.

The electrophotographic photoreceptor is cut into a size of 2 cm square, and the charge generation layer and the charge transport layer are removed by using a solvent such as THF such that the electrophotographic photoreceptor is formed of only the conductive substrate and the undercoat layer. Subsequently, the energy level in a range of 4.00 eV to 6.20 eV at a wavelength of 500 nm is measured using a photoelectron yield spectroscopic device (AC-2, manufactured by RIKEN KEIKI Co., Ltd.), and the intersection between the base line and a straight line drawn at a rising portion of the plot is defined as HOMO1 in a case where the energy of irradiation light is plotted on the horizontal axis, and the electron coefficient ratio is plotted on the vertical axis. Subsequently, the single film of the undercoat layer peeled off from the base material is measured in a wavelength range of 200 nm to 800 nm by a transmission method using an ultraviolet-visible near-infrared (UV-Vis-NIR) spectrophotometer (model number: Cary 5000, manufactured by Agilent Technologies, Inc.), and the absorption edge in a wavelength range of 400 nm to 700 nm is calculated to determine an energy gap ΔE (=HOMO−LUMO). Since the energy gap ΔE is a value obtained by subtracting LUMO from HOMO (ΔE=HOMO−LUMO), the LUMO energy (LUMO1) is determined by the following equation.

$$\text{LUMO1}=\text{HOMO1}-\Delta E \quad \text{Equation:}$$

A method of adjusting $E_{F1}-E_{LUMO1}$, $E_{F1}$, and $E_{LUMO1}$ is not particularly limited, and examples thereof include a method of adjusting the dispersion state of the electron transport material in the undercoat layer (specifically, a method of adjusting the blending ratio of the binder resin and the electron transport material near the surface of the undercoat layer on a photosensitive layer side; a method of adjusting the kind, the particle diameter, the aspect ratio, and the like of the electron transport material; or a method of adjusting the energy level by blending a plurality of electron transport materials having different energy levels).

The photosensitive layer of the image forming apparatus according to the present exemplary embodiment may be a lamination type photosensitive layer in which the photosensitive layer is formed of a charge generation layer provided on the undercoat layer and a charge transport layer provided on the charge generation layer or a single layer type photosensitive layer, but it is preferable that the photosensitive layer is, for example, a lamination type photosensitive layer.

The charge generation layer satisfies, for example, preferably Expression 2-1, more preferably Expression 2-2, and still more preferably Expression 2-3. In a case where the following expressions are satisfied, $E_{F2}-E_{LUMO2}$ is suppressed to be small as appropriate. Therefore, the accumulation of the energy barrier is likely to be suppressed at the interface between the undercoat layer and the charge generation layer. As a result, fogging of an image is further suppressed even in a case where the rotation speed of the electrophotographic photoreceptor is low.

$$0.90 \leq E_{F2}-E_{LUMO2} \leq 1.40 \quad \text{Expression 2-1:}$$

$$1.00 \leq E_{F2}-E_{LUMO2} \leq 1.35 \quad \text{Expression 2-2:}$$

$$1.10 \leq E_{F2}-E_{LUMO2} \leq 1.30 \quad \text{Expression 2-3:}$$

In Expressions 2-1, 2-2, and 2-3, $E_{F2}$ represents the Fermi level of the charge generation layer, and $E_{LUMO2}$ represents the energy level of LUMO of the charge generation layer.

The charge generation layer has, for example, a Fermi level $E_{F2}$ of preferably 4.50 eV or greater and 5.50 eV or less, more preferably 4.70 eV or greater and 5.30 eV or less, and still more preferably 4.90 eV or greater and 5.20 eV or less. In a case where the Fermi level $E_{F2}$ is in the above-described ranges, an increase in $E_{F2}-E_{LUMO2}$ is suppressed to be small as appropriate.

The charge generation layer has, for example, a LUMO energy level $E_{LUMO2}$ of preferably 3.50 eV or greater and 4.50 eV or less, more preferably 3.60 eV or greater and 4.30 eV or less, and still more preferably 3.80 eV or greater and 4.10 eV or less. In a case where the $E_{LUMO2}$ is in the above-described ranges, an increase in $E_{F2}-E_{LUMO2}$ is suppressed to be small as appropriate.

The Fermi level $E_{F2}$ of the charge generation layer is measured as follows.

The electrophotographic photoreceptor is cut into a size of 2 cm square, the charge transport layer (CT layer) is notched, and only the CT layer is peeled off with tweezers. Thereafter, only the charge generation layer (CG layer) is dissolved in a solvent such as THE to prepare a CG-dissolved solution. A Au-plated plate having a size of 2 cm square is coated with the prepared CG-dissolved solution, and the solvent is dried to prepare a measurement sample. This measurement sample is used to measure the Fermi level of the outer peripheral surface of the undercoat layer by a Kelvin probe method using a Fermi level measuring instrument (FAC-2, manufactured by Institute of Physical and Chemical Research).

The energy level $E_{LUMO2}$ of the LUMO of the charge generation layer is measured as follows.

The electrophotographic photoreceptor is cut into a size of 2 cm square, and only the charge transport layer (CT layer) is peeled off with tweezers. Subsequently, the outer peripheral surface of the exposed charge generation layer is measured in a range of 4.00 eV to 6.20 eV at a wavelength of 500 nm using a photoelectron yield spectroscopic device (AC-2, manufactured by RIKEN KEIKI Co., Ltd.), and the intersection between the base line and a straight line drawn at a rising portion of the plot is defined as HOMO2 in a case where the energy of irradiation light is plotted on the horizontal axis and the electron coefficient ratio is plotted on the vertical axis. Subsequently, a CG-dissolved solution obtained by dissolving only the charge generation layer (CG layer) in a solvent such as THE is measured in a wavelength range of 200 nm to 800 nm by a transmission method using an ultraviolet-visible near-infrared (UV-Vis-NIR) spectrophotometer (model number: Cary 5000, manufactured by Agilent Technologies, Inc.), and the absorption edge in a wavelength range of 400 nm to 700 nm is calculated to determine an energy gap ΔE (=HOMO−LUMO). Since the energy gap ΔE is a value obtained by subtracting LUMO from HOMO (ΔE=HOMO−LUMO), the LUMO energy (LUMO2) is determined by the following equation.

$$LUMO2=HOMO2-\Delta E \quad \text{Equation:}$$

A method of adjusting $E_{F2}-E_{LUMO2}$, $E_{F2}$, and $E_{LUMO2}$ is not particularly limited, and examples thereof include a method of adjusting the kind of the charge generation material and a method of adjusting the kind of the binder resin in the charge generation layer.

Hereinafter, each layer of the electrophotographic photoreceptor according to the present exemplary embodiment will be described in detail. Further, the reference numerals will not be provided.

Undercoat Layer

The undercoat layer contains a binder resin and an electron transport material and satisfies Expression 1-1.

$$0.20 \leq E_{F1}-E_{LUMO1} \leq 0.60 \quad \text{Expression 1-1:}$$

In Expression 1-1, $E_{F1}$ represents the Fermi level of the undercoat layer, and $E_{LUMO1}$ represents the energy level of the LUMO of the undercoat layer.

Examples of the binder resin include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin; a zirconium chelate compound; a titanium chelate compound; an aluminum chelate compound; a titanium alkoxide compound; an organic titanium compound; and known materials such as a silane coupling agent. Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable. In a case where these binder resins are used in combination of two or more kinds thereof, the mixing ratio thereof is set as necessary.

Examples of the electron transport material include a perinone-based compound; a naphthalenetetracarboxydiimide-based compound; a perylenetetracarboxylic acid diimide-based compound; a quinone-based compound such as p-benzoquinone, chloranil, bromanil, or anthraquinone; a tetracyanoquinodimethane-based compound; a fluorenone compound such as 2,4,7-trinitrofluorenone; a dinaphthoquinone compound, a diphenoquinone compound; a xanthone-based compound; a benzophenone-based compound; a cyanovinyl-based compound; and an electron-transporting compound such as an ethylene-based compound. The electron transport material may be used alone or in a mixture of two or more kinds thereof.

The average primary particle diameter of the electron transport material is, for example, preferably 80 nm or greater and 400 nm or less, more preferably 150 nm or greater and 340 nm or less, and still more preferably 180 nm or greater and 280 nm or less.

In a case where the average primary particle diameter of the electron transport material is 80 nm or greater, the $E_{F1}$ in the undercoat layer is suppressed from being extremely high or the $E_{LUMO1}$ is suppressed from being extremely low, and thus, for example, "$E_{F1}-E_{LUMO1}$" is likely to be adjusted to be in a preferable range. In a case where the average primary particle diameter of the electron transport material is 400 nm or less, the $E_{F1}$ in the undercoat layer is suppressed from being extremely high, and thus, for example, "$E_{F1}-E_{LUMO1}$" is likely to be adjusted to be in a preferable range.

The average primary particle diameter of the electron transport material is determined as follows.

The electrophotographic photoreceptor is cut into a size of 2 cm square, and the charge generation layer and the charge transport layer are removed by using a solvent such as THF such that the electrophotographic photoreceptor is formed of only the conductive substrate and the undercoat layer. Further, the surface of the undercoat layer is observed in a state where the acceleration voltage is optimized to pass through the resin layer on the surface of the undercoat layer by a secondary electron detector using a field emission type electron microscope. The long sides of any 100 particles of the electron transport material are measured in a state where the magnification of the field emission type electron microscope is set to 20,000 times, and the arithmetic average value of the measured values is defined as the average particle diameter.

The electron transport material has, for example, an aspect ratio of preferably 1.0 or greater and 4.2 or less, more preferably 1.0 or greater and 3.7 or less, and still more preferably 1.0 or greater and 3.2 or less.

In a case where the aspect ratio of the electron transport material is 1.0 or greater, the $E_{F1}$ in the undercoat layer is suppressed from being extremely high or the $E_{LUMO1}$ is suppressed from being extremely low, and thus, for example, "$E_{F1}$-$E_{LUMO1}$" is likely to be adjusted to be in a preferable range. In a case where the aspect ratio of the electron transport material is 4.2 or less, the $E_{F1}$ in the undercoat layer is suppressed from being extremely high, and thus, for example, "$E_{F1}$-$E_{LUMO1}$" is likely to be adjusted to be in a preferable range.

The aspect ratio of the electron transport material denotes a ratio (long side/short side) of the length of the electron transport material in the longitudinal direction (hereinafter, also referred to as a long side) which is a direction perpendicular to the long side to the length of the electron transport material in the lateral direction (hereinafter, also referred to as a short side).

The aspect ratio of the electron transport material is calculated as follows. The electrophotographic photoreceptor is cut into a size of 2 cm square, and the charge generation layer and the charge transport layer are removed by using a solvent such as THF such that the electrophotographic photoreceptor is formed of only the conductive substrate and the undercoat layer. Further, the surface of the electron transport material is observed in a state where the acceleration voltage is optimized to pass through the resin layer on the surface of the electron transport material using an electron microscope. The long sides and the short sides of any 100 particles of the electron transport material are measured in a state where the magnification of the electron microscope is set to 20,000 times, and the aspect ratio (long side/short side) is calculated for each particle. Further, the arithmetic average value of the obtained aspect ratios is defined as the aspect ratio of the electron transport material.

The electron transport material include, for example, preferably at least one electron transport material selected from the group consisting of compounds represented by General Formula (1), General Formula (2), General Formula (3), General Formula (4), General Formula (5), General Formula (6), General Formula (7), and General Formula (8) and more preferably at least one electron transport material selected from the group consisting of compounds represented by General Formula (1) and General Formula (2).

In a case where compounds represented by General Formulae (1) to (8) (for example, more preferably compounds represented by General Formulae (1) and (2)) are used as the electron transport material, "$E_{F1}$-$E_{LUMO1}$" is easily adjusted to be in a preferable range, and fogging is more likely to be suppressed.

General Formula (1)

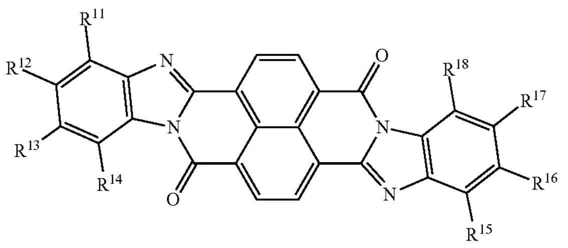

General Formula (2)

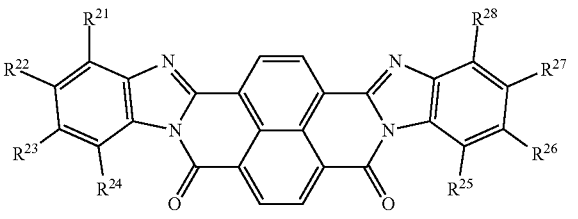

General Formula (3)

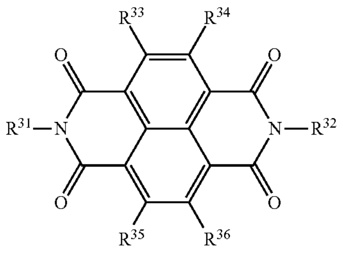

General Formula (4)

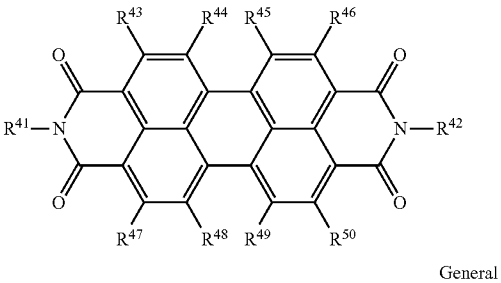

General Formula (5)

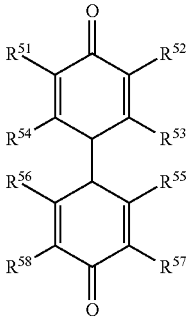

General Formula (6)

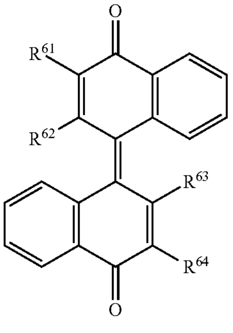

-continued

General Formula (7)

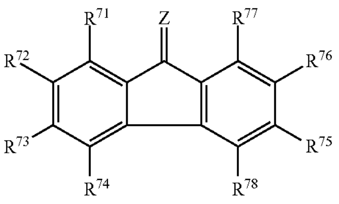

General Formula (8)

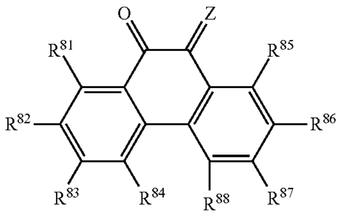

In General Formula (1), $R^{11}$, $R^{12}$, $R^{13}$, $R^{14}$, $R^{15}$, $R^{16}$, $R^{17}$, and $R^{18}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom. $R^{11}$ and $R^{12}$, $R^{12}$ and $R^{13}$, and $R^{13}$ and $R^{14}$ may be each independently linked to each other to form a ring, and $R^{15}$ and $R^{16}$, $R^{16}$ and $R^{17}$, and $R^{17}$ and $R^{8}$ may be each independently linked to each other to form a ring, in General Formula (2), $R^{21}$, $R^{22}$, $R^{23}$, $R^{24}$, $R^{25}$, $R^{26}$, $R^{27}$, and $R^{2'}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{21}$ and $R^{22}$, $R^{22}$ and $R^{23}$, and $R^{23}$ and $R^{24}$ may be each independently linked to each other to form a ring, and $R^{25}$ and $R^{26}$, $R^{26}$ and $R^{27}$, and $R^{27}$ and $R^{21}$ may be each independently linked to each other to form a ring, in General Formula (3), $R^{31}$, $R^{32}$, $R^{33}$, $R^{34}$, $R^{35}$, and $R^{36}$ each independently represent a hydrogen atom, an alkyl group, an alkoxy group, an aralkyl group, an aryl group, an alkoxycarbonyl group, or a halogen atom, in General Formula (4), $R^{41}$, $R^{42}$, $R^{43}$, $R^{44}$, $R^{45}$, $R^{46}$, $R^{47}$, $R^{48}$, $R^{49}$, and $R^{50}$ each independently represent a hydrogen atom, an alkyl group, an alkoxy group, an aralkyl group, an aryl group, an alkoxycarbonyl group, or a halogen atom, in General Formula (5), $R^{51}$, $R^{52}$, $R^{53}$, $R^{54}$, $R^{55}$, $R^{56}$, $R^{57}$, and $R^{58}$ each independently represent a hydrogen atom, an alkyl group, an alkoxy group, an aralkyl group, an aryl group, an alkoxycarbonyl group, or a halogen atom, in General Formula (6), $R^{61}$, $R^{62}$, $R^{63}$, and $R^{64}$ each independently represent a hydrogen atom, an alkyl group, an alkoxy group, an aralkyl group, an aryl group, an alkoxycarbonyl group, or a halogen atom, in General Formula (7), $R^{71}$, $R^{72}$, $R^{73}$, $R^{74}$, $R^{75}$, $R^{76}$, $R^{77}$, and $R^{78}$ each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$), in General Formula (8), $R^{81}$, $R^{82}$, $R^{83}$, $R^{84}$, $R^{85}$, $R^{86}$, $R^{87}$, and $R^{88}$ each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$)).

Compounds Represented by General Formulae (1) and (2)

Hereinafter, the compounds represented by General Formulae (1) and (2) will be described.

General Formula (1)

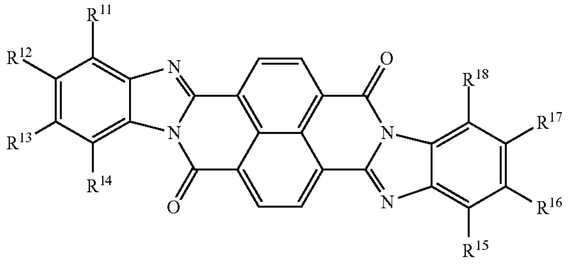

General Formula (2)

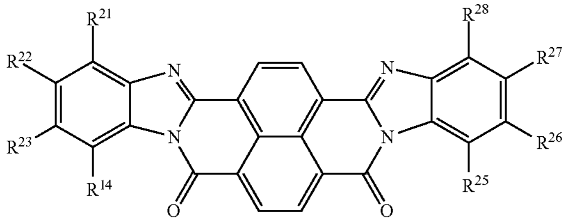

In General Formula (1), $R^{11}$, $R^{12}$, $R^{13}$, $R^{14}$, $R^{15}$, $R^{16}$, $R^{17}$, and $R^{18}$ (hereinafter, also simply referred to as "$R^{11}$ to $R^{18}$") each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom. $R^{11}$ and $R^{12}$, $R^{12}$ and $R^{13}$, and $R^{13}$ and $R^{14}$ may be each independently linked to each other to form a ring, and $R^{15}$ and $R^{16}$, $R^{16}$ and $R^{17}$, and $R^{17}$ and $R^{18}$ may be each independently linked to each other to form a ring.

In General Formula (2), $R^{21}$, $R^{22}$, $R^{23}$, $R^{24}$, $R^{25}$, $R^{26}$, $R^{27}$, and $R^{28}$ (hereinafter, also simply referred to as "$R^{21}$ to $R^{28}$") each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom. $R^{21}$ and $R^{22}$, $R^{22}$ and $R^{23}$, and $R^{23}$ and $R^{24}$ may be each independently linked to each other to form a ring, and $R^{25}$ and $R^{26}$, $R^{26}$ and $R^{27}$, and $R^{27}$ and $R^{28}$ may be each independently linked to each other to form a ring.

Examples of the alkyl group represented by $R^{11}$ to $R^{18}$ in General Formula (1) include a substituted or unsubstituted alkyl group.

Examples of the unsubstituted alkyl group represented by $R^{11}$ to $R^{18}$ in General Formula (1) include a linear alkyl group having 1 or more and 20 or less carbon atoms (for example, preferably 1 or more and 10 or less carbon atoms and more preferably 1 or more and 6 or less carbon atoms), a branched alkyl group having 3 or more and 20 or less carbon atoms (for example, preferably 3 or more and 10 or less carbon atoms), and a cyclic alkyl group having 3 or more and 20 or less carbon atoms (for example, preferably 3 or more and 10 or less carbon atoms).

Examples of the linear alkyl group having 1 or more and 20 or less carbon atoms include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Examples of the cyclic alkyl group having 3 or more and 20 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic) alkyl groups formed by these monocyclic alkyl groups being linked to each other.

Among these, for example, a linear alkyl group such as a methyl group or an ethyl group is preferable as the unsubstituted alkyl group.

Examples of the substituent in the alkyl group include an alkoxy group, a hydroxy group, a carboxy group, a nitro group, and a halogen atom (such as a fluorine atom, a bromine atom, or an iodine atom).

Examples of the alkoxy group that substitutes the hydrogen atom in the alkyl group include the same groups as the groups for the unsubstituted alkoxy group represented by $R^{11}$ to $R^{18}$ in General Formula (1).

Examples of the alkoxy group represented by $R^{11}$ to $R^{18}$ in General Formula (1) include a substituted or unsubstituted alkoxy group.

Examples of the unsubstituted alkoxy group represented by $R^{11}$ to $R^{18}$ in General Formula (1) include a linear, branched, or cyclic alkoxy group having 1 or more and 10 or less carbon atoms (for example, preferably 1 or more and 6 or less carbon atoms and more preferably 1 or more and 4 or less carbon atoms).

Specific examples of the linear alkoxy group include a methoxy group, an ethoxy group, an n-propoxy group, an n-butoxy group, an n-pentyloxy group, an n-hexyloxy group, an n-heptyloxy group, an n-octyloxy group, an n-nonyloxy group, and an n-decyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxy group, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, and a tert-decyloxy group.

Specific examples of the cyclic alkoxy group include a cyclopropoxy group, a cyclobutoxy group, a cyclopentyloxy group, a cyclohexyloxy group, a cycloheptyloxy group, a cyclooctyloxy group, a cyclononyloxy group, and a cyclodecyloxy group.

Among these, for example, a linear alkoxy group is preferable as the unsubstituted alkoxy group.

Examples of the substituent in the alkoxy group include an aryl group, an alkoxycarbonyl group, an aryloxycarbonyl group, a hydroxyl group, a carboxy group, a nitro group, and a halogen atom (such as a fluorine atom, a bromine atom, or an iodine atom).

Examples of the aryl group that substitutes a hydrogen atom in the alkoxy group include the same groups as the groups for the unsubstituted aryl group represented by $R^{11}$ to $R^{18}$ in General Formula (1).

Examples of the alkoxycarbonyl group that substitutes a hydrogen atom in the alkoxy group include the same groups as the groups for the unsubstituted alkoxycarbonyl group represented by $R^{11}$ to $R^{18}$ in General Formula (1).

Examples of the aryloxycarbonyl group that substitutes a hydrogen atom in the alkoxy group include the same groups as the groups for the unsubstituted aryloxycarbonyl group represented by $R^{11}$ to $R^{18}$ in General Formula (1).

Examples of the aralkyl group represented by $R^{11}$ to $R^{18}$ in General Formula (1) include a substituted or unsubstituted aralkyl group.

In General Formula (1), as the unsubstituted aralkyl group represented by $R^{11}$ to $R^{18}$, for example, an aralkyl group having 7 or more and 30 or less carbon atoms is preferable, an aralkyl group having 7 or more and 16 or less carbon atoms is more preferable, and an aralkyl group having 7 or more and 12 or less carbon atoms is still more preferable.

Examples of the unsubstituted aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

Examples of the substituent in the aralkyl group include an alkoxy group, an alkoxycarbonyl group, an aryloxycarbonyl group, and a halogen atom (such as a fluorine atom, a bromine atom, or an iodine atom).

Examples of the alkoxy group that substitutes a hydrogen atom in the aralkyl group include the same groups as the groups for the unsubstituted alkoxy group represented by $R^{11}$ to $R^{18}$ in General Formula (1).

Examples of the alkoxycarbonyl group that substitutes a hydrogen atom in the aralkyl group include the same groups as the groups for the unsubstituted alkoxycarbonyl group represented by $R^{11}$ to $R^{18}$ in General Formula (1).

Examples of the aryloxycarbonyl group that substitutes a hydrogen atom in the aralkyl group include the same groups as the groups for the unsubstituted aryloxycarbonyl group represented by $R^{11}$ to $R^{18}$ in General Formula (1).

Examples of the aryl group represented by $R^{11}$ to $R^{18}$ in General Formula (1) include a substituted or unsubstituted aryl group.

As the unsubstituted aryl group represented by $R^{11}$ to $R^{18}$ in General Formula (1), for example, an aryl group having 6 or more and 30 or less carbon atoms is preferable, an aryl group having 6 or more and 14 or less carbon atoms is more preferable, and an aryl group having 6 or more and 10 or less carbon atoms is still more preferable.

Examples of the aryl group having 6 or more and 30 or less carbon atoms include a phenyl group, a biphenyl group, a 1-naphthyl group, a 2-naphthyl group, a 9-anthryl group, a 9-phenanthryl group, a 1-pyrenyl group, a 5-naphthacenyl group, a 1-indenyl group, a 2-azulenyl group, a 9-fluorenyl group, a biphenylenyl group, an indacenyl group, a fluoranthenyl group, an acenaphthylenyl group, an aceanthrylenyl group, a phenalenyl group, a fluorenyl group, an anthryl group, a bianthracenyl group, a teranthracenyl group, a quarter anthracenyl group, an anthraquinolyl group, a phenanthryl group, a triphenylenyl group, a pyrenyl group, a chrysenyl group, a naphthacenyl group, a preadenyl group, a picenyl group, a perylenyl group, a pentaphenyl group, a pentacenyl group, a tetraphenylenyl group, a hexaphenyl group, a hexacenyl group, a rubisenyl group, and a coronenyl group. Among these, for example, a phenyl group is preferable.

Examples of the substituent in the aryl group include an alkyl group, an alkoxy group, an alkoxycarbonyl group, an aryloxycarbonyl group, and a halogen atom (such as a fluorine atom, a bromine atom, or an iodine atom).

Examples of the alkyl group that substitutes a hydrogen atom in the aryl group include the same groups as the groups for the unsubstituted alkyl group represented by $R^{11}$ to $R^{18}$ in General Formula (1).

Examples of the alkoxy group that substitutes a hydrogen atom in the aryl group include the same groups as the groups for the unsubstituted alkoxy group represented by $R^{11}$ to $R^{18}$ in General Formula (1).

Examples of the alkoxycarbonyl group that substitutes a hydrogen atom in the aryl group include the same groups as the groups for the unsubstituted alkoxycarbonyl group represented by $R^{11}$ to $R^{18}$ in General Formula (1).

Examples of the aryloxycarbonyl group that substitutes a hydrogen atom in the aryl group include the same groups as the groups for the unsubstituted aryloxycarbonyl group represented by $R^{11}$ to $R^{18}$ in General Formula (1).

Examples of the aryloxy group represented by $R^{11}$ to $R^{18}$ (—O—Ar, Ar represent an aryl group) in General Formula (1) include a substituted or unsubstituted aryloxy group.

As the unsubstituted aryloxy group represented by $R^{11}$ to $R^{18}$ in General Formula (1), for example, an aryloxy group having 6 or more and 30 or less carbon atoms is preferable, an aryloxy group having 6 or more and 14 or less carbon atoms is more preferable, and an aryloxy group having 6 or more and 10 or less carbon atoms is still more preferable.

Examples of the aryloxy group having 6 or more and 30 or less carbon atoms include a phenyloxy group (phenoxy group), a biphenyloxy group, a 1-naphthyloxy group, a 2-naphthyloxy group, a 9-anthryloxy group, a 9-phenanthryloxy group, a 1-pyrenyloxy group, a 5-naphthacenyloxy group, a 1-indenyloxy group, a 2-azulenyloxy group, a 9-fluorenyloxy group, a biphenylenyloxy group, an indacenyloxy group, a fluoranthenyloxy group, an acenaphthylenyloxy group, an aceanthryleneyloxy group, a phenalenyloxy group, a fluorenyloxy group, an anthryloxy group, a bianthracenyloxy group, a teranthracenyloxy group, a quarter anthracenyloxy group, an anthraquinolyloxy group, a phenanthryloxy group, a triphenylenyloxy group, a pyrenyloxy group, a chrysenyloxy group, a naphthacenyloxy group, a preadenyloxy group, a picenyloxy group, a perylenyloxy group, a pentaphenyloxy group, a pentacenyloxy group, a tetraphenylenyloxy group, a hexaphenyloxy group, a hexacenyloxy group, a rubisenyloxy group, and a coronenyloxy group. Among these, for example, a phenyloxy group (phenoxy group) is preferable.

Examples of the substituent in the aryloxy group include an alkyl group, an alkoxycarbonyl group, an aryloxycarbonyl group, and a halogen atom (such as a fluorine atom, a bromine atom, or an iodine atom).

Examples of the alkyl group that substitutes a hydrogen atom in the aryloxy group include the same groups as the groups for the unsubstituted alkyl group represented by $R^{11}$ to $R^{18}$ in General Formula (1).

Examples of the alkoxycarbonyl group that substitutes a hydrogen atom in the aryloxy group include the same groups as the groups for the unsubstituted alkoxycarbonyl group represented by $R^{11}$ to $R^{18}$ in General Formula (1).

Examples of the aryloxycarbonyl group that substitutes a hydrogen atom in the aryloxy group include the same groups as the groups for the unsubstituted aryloxycarbonyl group represented by $R^{11}$ to $R^{18}$ in General Formula (1).

Examples of the alkoxycarbonyl group represented by $R^{11}$ to $R^{18}$ (—CO—OR, R represent an alkyl group) in General Formula (1) include a substituted or unsubstituted alkoxycarbonyl group.

The number of carbon atoms of the alkyl chain in the unsubstituted alkoxycarbonyl group represented by $R^{11}$ to $R^{18}$ in General Formula (1) is, for example, preferably 1 or more and 20 or less, more preferably 1 or more and 15 or less, and still more preferably 1 or more and 10 or less.

Examples of the alkoxycarbonyl group having 1 or more and 20 or less carbon atoms in the alkyl chain include a methoxycarbonyl group, an ethoxycarbonyl group, a propoxycarbonyl group, an isopropoxycarbonyl group, an n-butoxycarbonyl group, a sec-butoxybutylcarbonyl group, a tert-butoxycarbonyl group, a pentaoxycarbonyl group, a hexaoxycarbonyl group, a heptaoxycarbonyl group, an octaoxycarbonyl group, a nonaoxycarbonyl group, a decaoxycarbonyl group, a dodecaoxycarbonyl group, a tridecaoxycarbonyl group, a tetradecaoxycarbonyl group, a pentadecaoxycarbonyl group, a hexadecaoxycarbonyl group, a heptadecaoxycarbonyl group, an octadecaoxycarbonyl group, a nonadecaoxycarbonyl group, and an icosaoxycarbonyl group.

Examples of the substituent in the alkoxycarbonyl group include an aryl group, a hydroxy group, and a halogen atom (such as a fluorine atom, a bromine atom, or an iodine atom).

Examples of the aryl group that substitutes a hydrogen atom in the alkoxycarbonyl group include the same groups as the groups for the unsubstituted aryl group represented by $R^{11}$ to $R^{18}$ in General Formula (1).

Examples of the aryloxycarbonyl group represented by $R^{11}$ to $R^{18}$ (—CO—OAr, Ar represents an aryl group) in General Formula (1) include a substituted or unsubstituted aryloxycarbonyl group.

The number of carbon atoms of the aryl group in the unsubstituted aryloxycarbonyl group represented by $R^{11}$ to $R^{18}$ in General Formula (1) is, for example, preferably 6 or more and 30 or less, more preferably 6 or more and 14 or less, and still more preferably 6 or more and 10 or less.

Examples of the aryloxycarbonyl group containing an aryl group with 6 or more and 30 or less carbon atoms include a phenoxycarbonyl group, a biphenyloxycarbonyl group, a 1-naphthyloxycarbonyl group, a 2-naphthyloxycarbonyl group, a 9-anthryloxycarbonyl group, a 9-phenanthryloxycarbonyl group, a 1-pyrenyloxycarbonyl group, a 5-naphthacenyloxycarbonyl group, a 1-indenyloxycarbonyl group, a 2-azulenyloxycarbonyl group, a 9-fluorenyloxycarbonyl group, a biphenylenyloxycarbonyl group, an indacenyloxycarbonyl group, a fluoranthenyloxycarbonyl group, an acenaphthylenyloxycarbonyl group, an aceanthryleneyloxycarbonyl group, a phenalenyloxycarbonyl group, a fluorenyloxycarbonyl group, an anthryloxycarbonyl group, a bianthracenyloxycarbonyl group, a teranthracenyloxycarbonyl group, a quarter anthracenyloxycarbonyl group, an anthraquinolyloxycarbonyl group, a phenanthryloxycarbonyl group, a triphenylenyloxycarbonyl group, a pyrenyloxycarbonyl group, a chrysenyloxycarbonyl group, a naphthacenyloxycarbonyl group, a preadenyloxycarbonyl group, a picenyloxycarbonyl group, a perylenyloxycarbonyl group, a pentaphenyloxycarbonyl group, a pentacenyloxycarbonyl group, a tetraphenylenyloxycarbonyl group, a hexaphenyloxycarbonyl group, a hexacenyloxycarbonyl group, a rubisenyloxycarbonyl group, and a coronenyloxycarbonyl group. Among these, for example, a phenoxycarbonyl group is preferable.

Examples of the substituent in the aryloxycarbonyl group include an alkyl group, a hydroxy group, and a halogen atom (such as a fluorine atom, a bromine atom, or an iodine atom).

Examples of the alkyl group that substitutes a hydrogen atom of the aryloxycarbonyl group include the same groups as the groups for the unsubstituted alkyl group represented by $R^{11}$ to $R^{18}$ in General Formula (1).

Examples of the alkoxycarbonylalkyl group represented by $R^{11}$ to $R^{18}$ ($-(C_nH_{2n})-CO-OR$, R represents an alkyl group, and n represents an integer of 1 or greater) in General Formula (1) include a substituted or unsubstituted alkoxycarbonylalkyl group.

Examples of the alkoxycarbonyl group ($-CO-OR$) in the unsubstituted alkoxycarbonylalkyl group represented by $R^{11}$ to $R^{18}$ in General Formula (1) include the same groups as the groups for the alkoxycarbonyl group represented by $R^{11}$ to $R^{18}$ in General Formula (1).

Examples of the alkylene chain ($-C_nH_{2n}-$) in the unsubstituted alkoxycarbonylalkyl group represented by $R^{11}$ to $R^{18}$ in General Formula (1) include a linear alkylene chain having 1 or more and 20 or less carbon atoms (for example, preferably 1 or more and 10 or less carbon atoms and more preferably 1 or more and 6 or less carbon atoms), a branched alkylene chain having 3 or more and 20 or less carbon atoms (for example, preferably 3 or more and 10 or less carbon atoms), and a cyclic alkylene chain having 3 or more and 20 or less carbon atoms (for example, preferably 3 or more and 10 or less carbon atoms).

Examples of the linear alkylene chain having 1 or more and 20 or less carbon atoms include a methylene group, an ethylene group, an n-propylene group, an n-butylene group, an n-pentylene group, an n-hexylene group, an n-heptylene group, an n-octylene group, an n-nonylene group, an n-decylene group, an n-undecylene group, an n-dodecylene group, a tridecylene group, an n-tetradecylene group, an n-pentadecylene group, an n-heptadecylene group, an n-octadecylene group, an n-nonadecylene group, and an n-icosylene group.

Examples of the branched alkylene chain having 3 or more and 20 or less carbon atoms include an isopropylene group, an isobutylene group, a sec-butylene group, a tert-butylene group, an isopentylene group, a neopentylene group, a tert-pentylene group, an isohexylene group, a sec-hexylene group, a tert-hexylene group, an isoheptylene group, a sec-heptylene group, a tert-heptylene group, an isooctylene group, a sec-octylene group, a tert-octylene group, an isononylene group, a sec-nonylene group, a tert-nonylene group, an isodecylene group, a sec-decylene group, a tert-decylene group, an isododecylene group, a sec-dodecylene group, a tert-dodecylene group, a tert-tetradecylene group, and a tert-pentadecylene group.

Examples of the cyclic alkylene chain having 3 or more and 20 or less carbon atoms include a cyclopropylene group, a cyclobutylene group, a cyclopentylene group, a cyclohexylene group, a cycloheptyrene group, a cyclooctylene group, a cyclononylene group, and a cyclodecylene group.

Examples of the substituent in the alkoxycarbonylalkyl group include an aryl group, a hydroxy group, and a halogen atom (such as a fluorine atom, a bromine atom, or an iodine atom). Examples of the aryl group that substitutes a hydrogen atom of the alkoxycarbonylalkyl group include the same groups as the groups for the unsubstituted aryl group represented by $R^{11}$ to $R^{18}$ in General Formula (1).

Examples of the aryloxycarbonylalkyl groups represented by $R^{11}$ to $R^{18}$ ($-(C_nH_{2n})-CO-OAr$, Ar represents an aryl group, and n represents an integer of 1 or greater) in General Formula (1) include a substituted or unsubstituted aryloxycarbonylalkyl group.

Examples of the aryloxycarbonyl group ($-CO-OAr$, Ar represents an aryl group) in the unsubstituted aryloxycarbonylalkyl group represented by $R^{11}$ to $R^{18}$ in General Formula (1) include the same groups as the groups for the aryloxycarbonyl group represented by $R^{11}$ to $R^{18}$ in General Formula (1).

Examples of the alkylene chain ($-C_nH_{2n}-$) in the unsubstituted aryloxycarbonylalkyl group represented by $R^{11}$ to $R^{18}$ in General Formula (1) include the same groups as the groups for the alkylene chain in the alkoxycarbonylalkyl group represented by $R^{11}$ to $R^{18}$ in General Formula (1).

Examples of the substituent in the aryloxycarbonylalkyl group include an alkyl group, a hydroxy group, and a halogen atom (such as a fluorine atom, a bromine atom, or an iodine atom).

Examples of the alkyl group that substitutes a hydrogen atom of the aryloxycarbonylalkyl group include the same groups as the groups for the unsubstituted alkyl group represented by $R^{11}$ to $R^{18}$ in General Formula (1).

Examples of the halogen atom represented by $R^{11}$ to $R^{18}$ in General Formula (1) include a fluorine atom, a chlorine atom, a bromine atom, and an iodine atom.

Examples of the ring structure formed by $R^{11}$ and $R^{12}$, $R^{12}$ and $R^{13}$, $R^{13}$ and $R^{14}$, $R^{15}$ and $R^{16}$, $R^{16}$ and $R^{17}$, or $R^{17}$ and $R^{18}$ in General Formula (1) being linked to each other include a benzene ring and a fused ring having 10 or more and 18 or less carbon atoms (such as a naphthalene ring, an anthracene ring, a phenanthrene ring, a chrysene ring (benzo[α]phenanthrene ring), a tetracene ring, a tetraphene ring (benzo[α]anthracene ring), or a triphenylene ring). Among these, for example, a benzene ring is preferable as the ring structure to be formed.

Examples of the alkyl group represented by $R^{21}$ to $R^{28}$ in General Formula (2) include the same groups as the groups for the alkyl group represented by $R^{11}$ to $R^{18}$ in General Formula (1).

Examples of the alkoxy group represented by $R^{21}$ to $R^{28}$ in General Formula (2) include the same groups as the groups for the alkoxy group represented by $R^{11}$ to $R^{18}$ in General Formula (1).

Examples of the aralkyl group represented by $R^{21}$ to $R^{28}$ in General Formula (2) include the same groups as the groups for the aralkyl group represented by $R^{11}$ to $R^{18}$ in General Formula (1).

Examples of the aryl group represented by $R^{21}$ to $R^{28}$ in General Formula (2) include the same groups as the groups for the aryl group represented by $R^{11}$ to $R^{18}$ in General Formula (1).

Examples of the aryloxy group represented by $R^{21}$ to $R^{28}$ in General Formula (2) include the same groups as the groups for the aryloxy group represented by $R^{11}$ to $R^{18}$ in General Formula (1).

Examples of the alkoxycarbonyl group represented by $R^{21}$ to $R^{28}$ in General Formula (2) include the same groups as the groups for the alkoxycarbonyl group represented by $R^{11}$ to $R^{18}$ in General Formula (1).

Examples of the aryloxycarbonyl group represented by $R^{21}$ to $R^{28}$ in General Formula (2) include the same groups as the groups for the aryloxycarbonyl group represented by $R^{11}$ to $R^{18}$ in General Formula (1).

Examples of the alkoxycarbonylalkyl group represented by $R^{21}$ to $R^{28}$ in General Formula (2) include the same groups as the groups for the alkoxycarbonylalkyl group represented by $R^{11}$ to $R^{18}$ in General Formula (1).

Examples of the aryloxycarbonylalkyl group represented by $R^{21}$ to $R^{28}$ in General Formula (2) include the same groups as the groups for the aryloxycarbonylalkyl group represented by $R^{11}$ to $R^{18}$ in General Formula (1).

Examples of the halogen atom represented by $R^{21}$ to $R^{28}$ in General Formula (2) include the same atoms as the atoms for the halogen atom represented by $R^{11}$ to $R^{18}$ in General Formula (1).

Examples of the ring structure formed by $R^{21}$ and $R^{22}$, $R^{22}$ and $R^{23}$, $R^{23}$ and $R^{24}$, $R^{25}$ and $R^{26}$, $R^{26}$ and $R^{27}$, or $R^{27}$ and $R^{28}$ in General Formula (2) being linked to each other include a benzene ring and a fused ring having 10 or more and 18 or less carbon atoms (such as a naphthalene ring, an anthracene ring, a phenanthrene ring, a chrysene ring (benzo[α]phenanthrene ring), a tetracene ring, a tetraphene ring (benzo[α]anthracene ring), or a triphenylene ring). Among these, for example, a benzene ring is preferable as the ring structure to be formed.

It is preferable that $R^{11}$, $R^{12}$, $R^{13}$, $R^{14}$, $R^{15}$, $R^{16}$, $R^{17}$, and $R^{18}$ in General Formula (1) each independently represent, for example, a hydrogen atom, an alkyl group, an alkoxycarbonyl group, an aryloxycarbonyl group, an alkoxycarbonylalkyl group, or an aryloxycarbonylalkyl group.

It is preferable that $R^{21}$, $R^{22}$, $R^{23}$, $R^{24}$, $R^{25}$, $R^{26}$, $R^{27}$, and $R^{28}$ in General Formula (2) each independently represent, for example, a hydrogen atom, an alkyl group, an alkoxycarbonyl group, an aryloxycarbonyl group, an alkoxycarbonylalkyl group, or an aryloxycarbonylalkyl group.

Hereinafter, specific examples of the compound represented by General Formula (1) or General Formula (2) will be described, but the present exemplary embodiment is not limited thereto.

In the specific examples of the compounds represented by Formulae (1) and (2), Ph represents a phenyl group.

1-1

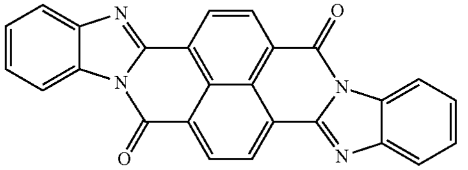

1-2

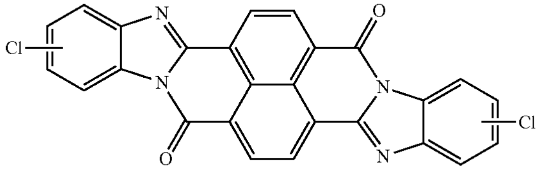

1-3

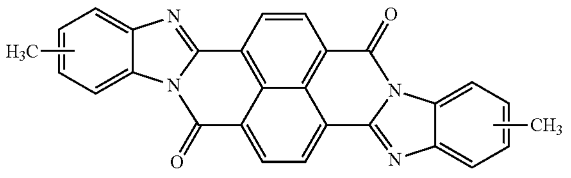

1-4

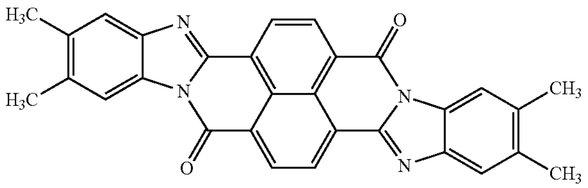

1-5

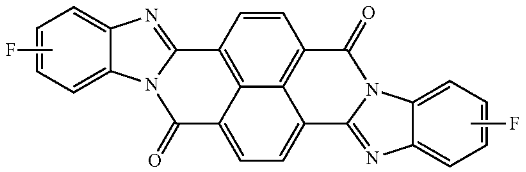

1-6

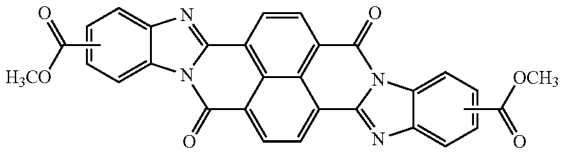

1-7

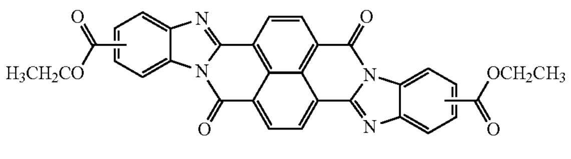

1-8

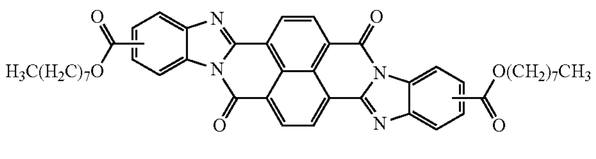

-continued
1-9
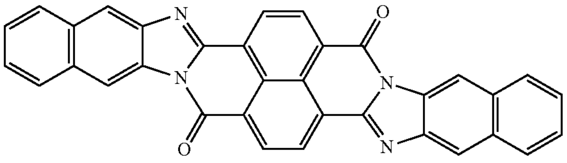
1-10
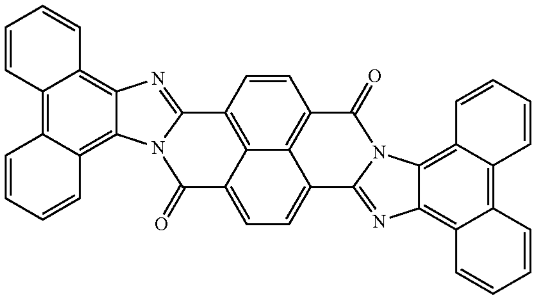
1-11
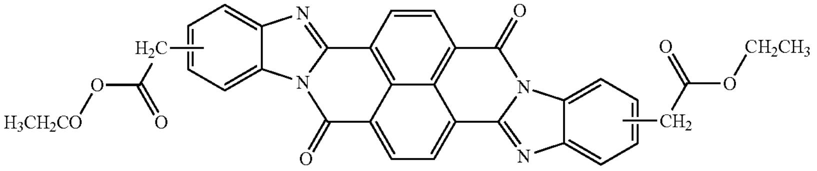
1-12
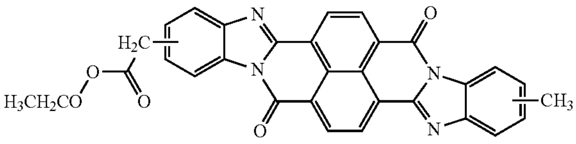
1-13
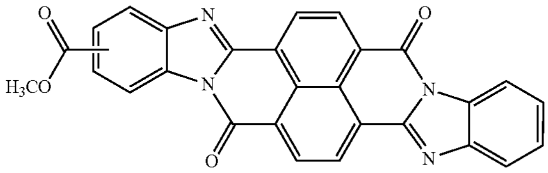
1-14
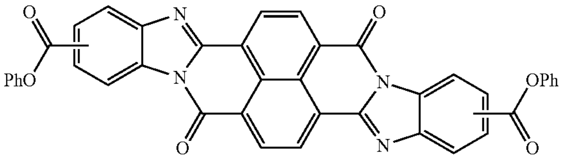
1-15
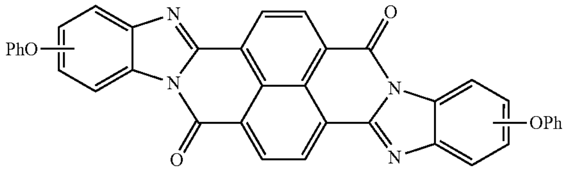
1-16
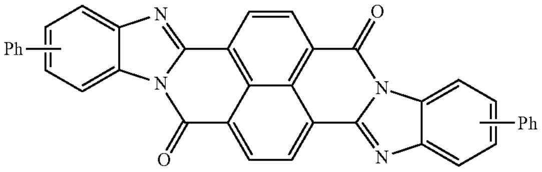
1-17
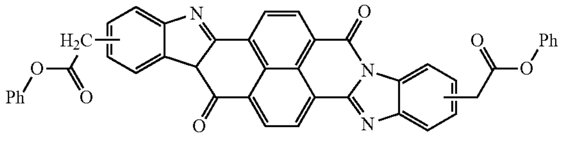
1-18
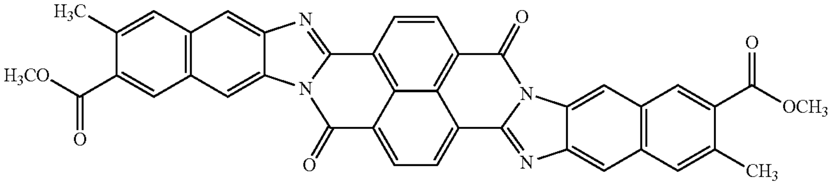
2-1
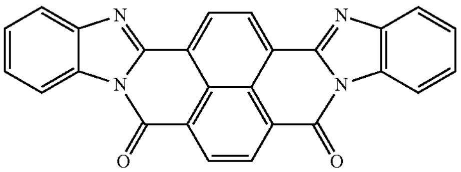
2-2
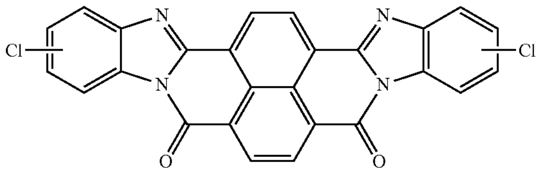

-continued
2-3
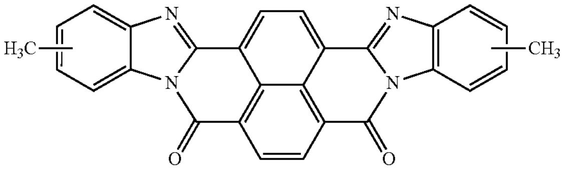
2-4
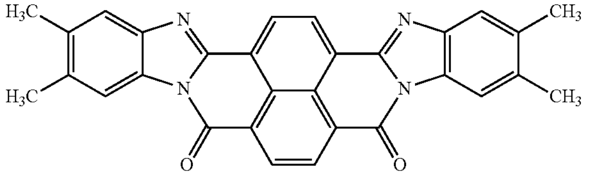
2-5
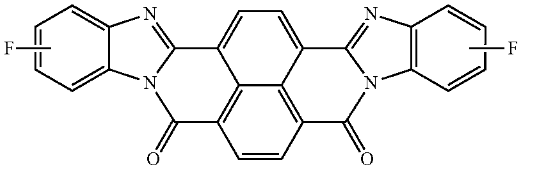
2-6
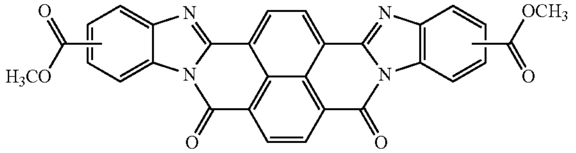
2-7
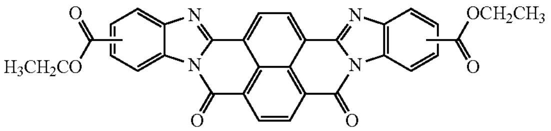
2-8
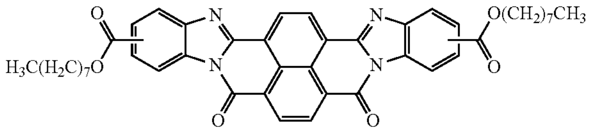
2-9
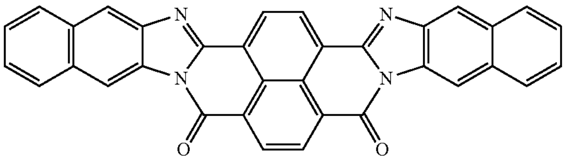
2-10
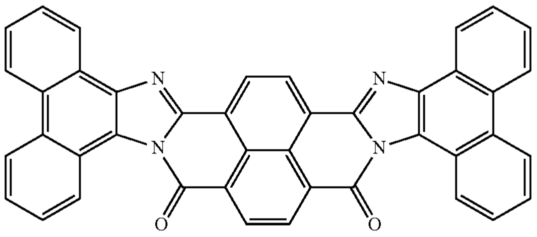
2-11
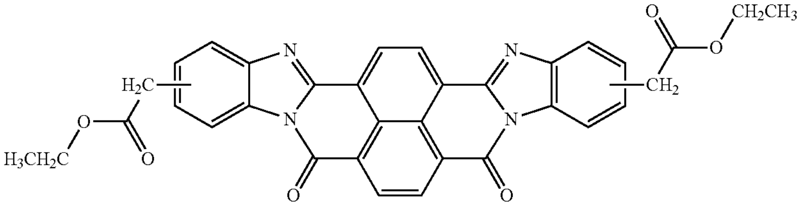
2-12
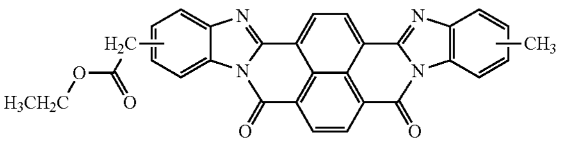
2-13
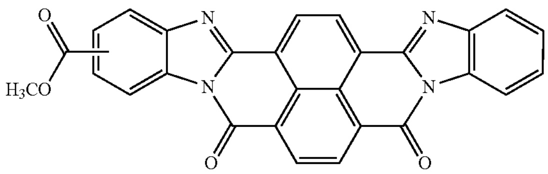
2-14
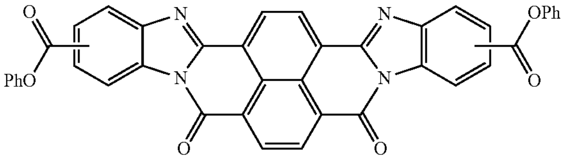
2-15
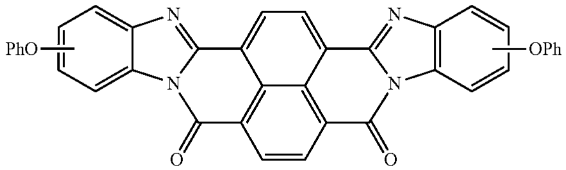

-continued 2-16

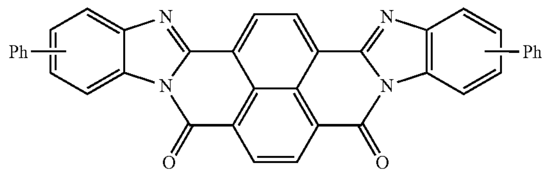

2-17

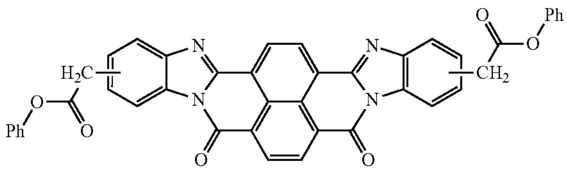

2-18

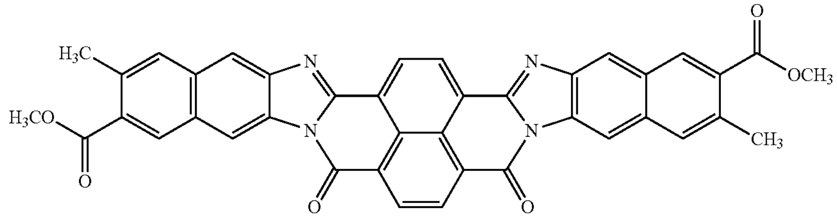

The compound represented by General Formula (1) and the compound represented by General Formula (2) have an isomer relationship (that is, a relationship between a cis form and a trans form). As a typical synthesis method, 2 moles of an orthophenylenediamine compound and 1 mole of a naphthalenetetracarboxylic acid compound are synthesized by being heated and condensed, a mixture of a cis form and a trans form is obtained, and the proportion of the cis form is typically greater than the trans form in the mixing ratio thereof. The soluble cis form and the sparingly soluble trans form can be separated by, for example, being heated and washed with potassium hydroxide in an alcohol solution.

Compound Represented by General Formula (3)

Hereinafter, the compound represented by General Formula (3) will be described.

General Formula (3)

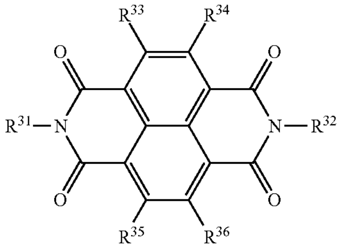

In General Formula (3), $R^{31}$, $R^{32}$, $R^{33}$, $R^{34}$, $R^{35}$, and $R^{36}$ (hereinafter, also simply referred to as "$R^{31}$ to $R^{36}$") each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{31}$ to $R^{36}$ in General Formula (3) include the same groups and the same atoms as the groups and the atoms for the alkyl group, the alkoxy group, the aralkyl group, the aryl group, the alkoxycarbonyl group, and the halogen atom represented by $R^{11}$ to $R^{18}$ in General Formula (1).

The alkyl group, the alkoxy group, the aralkyl group, the aryl group, and the alkoxycarbonyl group represented by $R^{31}$ to $R^{36}$ in General Formula (3) may have the same substituents as the substituents for the alkyl group, the alkoxy group, the aralkyl group, the aryl group, and the alkoxycarbonyl group represented by $R^{11}$ to $R^{18}$ in General Formula (1).

Hereinafter, exemplary compounds of the compound represented by General Formula (3) will be shown, but the present exemplary embodiment is not limited thereto. Further, the following exemplary compound numbers will be referred to as exemplary compounds (3-numbers) below. Specifically, for example, an exemplary compound 5 will be referred to as "exemplary compound (3-5)".

| Exemplary compound | $R^{31}$ | $R^{32}$ | $R^{33}$ | $R^{34}$ | $R^{35}$ | $R^{36}$ |
|---|---|---|---|---|---|---|
| 1 | H | H | H | H | H | H |
| 2 | $-CH_3$ | $-CH_3$ | H | H | H | H |
| 3 | -Pr | -Pr | H | H | H | H |
| 4 | $-CH_2COOCH_3$ | $-CH_2COOCH_3$ | H | H | H | H |
| 5 | $-c-C_6H_{11}$ | $-c-C_6H_{11}$ | H | H | H | H |
| 6 | $-c-C_6H_{11}$ | $-c-C_6H_{11}$ | -Br | H | H | -Br |
| 7 | $-C_6H_5$ | $-C_6H_5$ | H | H | H | H |
| 8 | $-p-Cl-C_6H_4$ | $-p-Cl-C_6H_4$ | H | H | H | H |
| 9 | $-CH_2C_6H_5$ | $-CH_2C_6H_5$ | H | H | H | H |
| 10 | $-CH_2CH_2C_6H_5$ | $-CH_2CH_2C_6H_5$ | H | H | H | H |

Further, the abbreviations and the like in the above-described exemplary compounds have the following meanings.

Pr: n-propyl group $c-C_6H_{11}$: cyclohexyl group $C_6H_5$: phenyl group $p-Cl-C_6H_4$: para-chlorophenyl group $CH_2C_6H_5$: benzyl group $CH_2CH_2C_6H_5$: penethyl group Compound Represented by General Formula (4)

Hereinafter, the compound represented by General Formula (4) will be described.

General Formula (4)

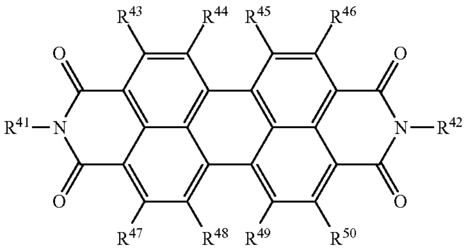

In General Formula (4), $R^{41}$, $R^{42}$, $R^{43}$, $R^{44}$, $R^{45}$, $R^{46}$, $R^{47}$, $R^{48}$, $R^{49}$, and $R^{50}$ (hereinafter, also simply referred to as "$R^{41}$ to $R^{50}$") each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{41}$ to $R^{50}$ in General Formula (4) include the same groups and the same atoms as the groups and the atoms for the alkyl group, the alkoxy group, the aralkyl group, the aryl group, the alkoxycarbonyl group, and the halogen atom represented by $R^{11}$ to $R^{18}$ in General Formula (1).

The alkyl group, the alkoxy group, the aralkyl group, the aryl group, and the alkoxycarbonyl group represented by $R^{41}$ to $R^{50}$ in General Formula (4) may have the same substituents as the substituents for the alkyl group, the alkoxy group, the aralkyl group, the aryl group, and the alkoxycarbonyl group represented by $R^{11}$ to $R^{18}$ in General Formula (1).

Hereinafter, exemplary compounds of the compound represented by General Formula (4) will be shown, but the present exemplary embodiment is not limited thereto. Further, the following exemplary compound numbers will be referred to as exemplary compounds (4-numbers) below. Specifically, for example, an exemplary compound 5 will be referred to as "exemplary compound (4-5)".

| Exemplary compound | $R^{41}$ | $R^{42}$ | $R^{43}$ | $R^{44}$ | $R^{45}$ | $R^{46}$ | $R^{47}$ | $R^{48}$ | $R^{49}$ | $R^{50}$ |
|---|---|---|---|---|---|---|---|---|---|---|
| 1 | H | H | H | H | H | H | H | H | H | H |
| 2 | $—CH_3$ | $—CH_3$ | H | H | H | H | H | H | H | H |
| 3 | $—CH_3$ | $—CH_3$ | H | —Cl | —Cl | H | H | —Cl | —Cl | H |
| 4 | -Bu | -Bu | H | F | H | H | H | H | F | H |
| 5 | $-c-C_6H_{11}$ | $-c-C_6H_{11}$ | H | H | H | H | H | H | H | H |
| 6 | $-p-CH_3—C_6H_4$ | $-p-CH_3—C_6H_5$ | H | H | H | H | H | H | H | H |
| 7 | $—C_6H_5$ | $—C_6H_5$ | H | H | H | H | H | H | H | H |
| 8 | $-p-Cl—C_6H_4$ | $-p-Cl—C_6H_4$ | H | H | H | H | H | H | H | H |
| 9 | $-o-Cl—C_6H_4$ | $-o-Cl—C_6H_4$ | H | H | H | H | H | H | H | H |
| 10 | $—CH_2C_6H_5$ | $—CH_2C_6H_5$ | H | H | H | H | H | H | H | H |
| 11 | $-3,5-(CH_3)_2—C_6H_3$ | $-3,5-(CH_3)_2—C_6H_3$ | H | H | H | H | H | H | H | H |
| 12 | $-3,5-Cl_2—C_6H_3$ | $-3,5-Cl_2—C_6H_3$ | H | H | H | H | H | H | H | H |

Further, the abbreviations and the like in the above-described exemplary compounds have the following meanings.

Bu: n-butyl group $c-C_6H_{11}$: cyclohexyl group $p-CH_3—C_6H_4$: para-tolyl group $C_6H_5$: phenyl group $p-Cl—C_6H_4$: para-chlorophenyl group $O—Cl—C_6H_4$: ortho-chlorophenyl group $CH_2C_6H_5$: benzyl group $3,5-(CH_3)_2—C_6H_3$: 3,5-dimethylphenyl group $3,5-Cl_2—C_6H_3$: 3,5-dichlorophenyl group Compound Represented by General Formula (5)

Hereinafter, the compound represented by General Formula (5) will be described.

General Formula (5)

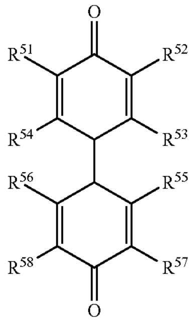

In General Formula (5), $R^{51}$, $R^{52}$, $R^{53}$, $R^{54}$, $R^{55}$, $R^{56}$, $R^{57}$, and $R^{58}$ (hereinafter, also referred to as "$R^{51}$ to $R^{58}$") each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{51}$ to $R^{58}$ in General Formula (5) include the same groups and the same atoms as the groups and the atoms for the alkyl group, the alkoxy group, the aralkyl group, the aryl group, the alkoxycarbonyl group, and the halogen atom represented by $R^{11}$ to $R^{18}$ in General Formula (1).

The alkyl group, the alkoxy group, the aralkyl group, the aryl group, and the alkoxycarbonyl group represented by $R^{51}$ to $R^{58}$ in General Formula (5) may have the same substituents as the substituents for the alkyl group, the alkoxy group, the aralkyl group, the aryl group, and the alkoxycarbonyl group represented by $R^{11}$ to $R^{18}$ in General Formula (1).

$R^{51}$ to $R^{58}$ in General Formula (5) may each independently represent a hydrogen atom, an alkyl group having 1 or more and 12 or less carbon atoms, an alkoxy group having 1 or more and 12 or less carbon atoms, a cycloalkyl group, an aryl group, or an aralkyl group.

From the viewpoint of further suppressing the residual potential, $R^{51}$ and $R^{58}$ in General Formula (5) each independently represent, for example, preferably an alkyl group having 3 or more and 12 or less carbon atoms, an alkoxy group having 3 or more and 12 or less carbon atoms, a cycloalkyl group, an aryl group, or an aralkyl group, more preferably a branched alkyl group having 3 or more and 12 or less carbon atoms, a branched alkoxy group having 3 or more and 12 or less carbon atoms, a cycloalkyl group, an aryl group, or an aralkyl group, still more preferably a branched alkyl group having 3 or more and 8 or less carbon atoms or a branched alkoxy group having 3 or more and 8 or less carbon atoms, and particularly preferably a t-butyl group.

From the viewpoint of further suppressing the residual potential, $R^{52}$ and $R^{57}$ in General Formula (5) each independently represent, for example, preferably a hydrogen atom, an alkyl group having 1 or more and 8 or less carbon atoms, or an alkoxy group having 1 or more and 8 or less carbon atoms, more preferably a hydrogen atom, a linear alkyl group having 1 or more and 4 or less carbon atoms, or a linear alkoxy group having 1 or more and 4 or less carbon atoms, still more preferably a linear alkyl group having 1 or more and 3 or less carbon atoms or a linear alkoxy group having 1 or more and 3 or less carbon atoms, and particularly preferably a methyl group.

In General Formula (5), it is preferable that $R^{53}$, $R^{54}$, $R^{55}$, and $R^{56}$ represent, for example, a hydrogen atom.

In General Formula (5), it is preferable that $R^{51}$ and $R^{58}$ represent, for example, the same group from the viewpoint of further suppressing the residual potential.

In General Formula (5), it is preferable that $R^{52}$ and $R^{57}$ represent, for example, the same group from the viewpoint of further suppressing the residual potential.

In General Formula (5), it is preferable that $R^{51}$ and $R^{52}$ represent, for example, different groups from the viewpoint of further suppressing the residual potential.

In General Formula (5), it is preferable that $R^{57}$ and $R^{58}$ represent, for example, different groups from the viewpoint of further suppressing the residual potential.

Hereinafter, exemplary compounds of the compound represented by General Formula (5) will be shown, but the present exemplary embodiment is not limited thereto. Further, the following exemplary compound numbers will be referred to as exemplary compounds (5-numbers) below. Specifically, for example, an exemplary compound 5 will be referred to as "exemplary compound (5-5)".

| Exemplary compound | $R^{51}$ | $R^{52}$ | $R^{53}$ | $R^{54}$ | $R^{55}$ | $R^{56}$ | $R^{57}$ | $R^{58}$ |
|---|---|---|---|---|---|---|---|---|
| 1 | $-t-C_4H_9$ | $—CH_3$ | H | H | H | H | $—CH_3$ | $-t-C_4H_9$ |
| 2 | $-t-C_4H_9$ | H | H | H | H | H | H | $-t-C_4H_9$ |
| 3 | $-t-C_4H_9$ | $—OCH_3$ | H | H | H | H | $—OCH_3$ | $-t-C_4H_9$ |
| 4 | $-t-C_4H_9O$ | $—CH_3$ | H | H | H | H | $—CH_3$ | $-t-C_4H_9O$ |
| 5 | $-c-C_6H_{11}$ | $—CH_3$ | H | H | H | H | $—CH_3$ | $-c-C_6H_{11}$ |
| 6 | $—C_6H_5$ | $—CH_3$ | H | H | H | H | $—CH_3$ | $—C_6H_5$ |
| 7 | $—CH_2C_6H_5$ | $—CH_3$ | H | H | H | H | $—CH_3$ | $—CH_2C_6H_5$ |
| 8 | $-t-C_4H_9$ | $-t-C_4H_9$ | H | H | H | H | $-t-C_4H_9$ | $-t-C_4H_9$ |

Further, the abbreviations and the like in the above-described exemplary compounds have the following meanings.

$t-C_4H_9$: t-butyl group $OCH_3$: methoxy group $t-C_4H_9O$: t-butoxy group $c-C_6H_{11}$: cyclohexyl group $C_6H_5$: phenyl group $CH_2C_6H_5$: benzyl group Compound Represented by General Formula (6)

Hereinafter, the compound represented by General Formula (6) will be described.

General Formula (6)

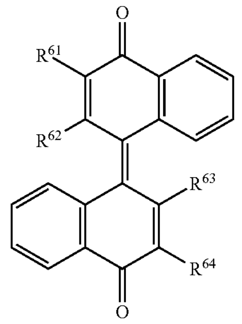

In General Formula (6), $R^{61}$, $R^{62}$, $R^{63}$, and $R^{64}$ (hereinafter, also simply referred to as "$R^{61}$ to $R^{64}$") each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{61}$ to $R^{64}$ in General Formula (6) include the same groups as the groups for the alkyl group, the alkoxy group, the aralkyl group, the aryl group, the alkoxycarbonyl group, and the halogen atom represented by $R^{11}$ to $R^{18}$ in General Formula (1).

The alkyl group, the alkoxy group, the aralkyl group, the aryl group, and the alkoxycarbonyl group represented by $R^{61}$ to $R^{64}$ in General Formula (6) may have the same substituents as the substituents for the alkyl group, the alkoxy group, the aralkyl group, the aryl group, and the alkoxycarbonyl group represented by $R^{11}$ to $R^{18}$ in General Formula (1).

$R^{61}$ to $R^{64}$ in General Formula (6) may each independently represent a hydrogen atom, an alkyl group having 1 or more and 12 or less carbon atoms, an alkoxy group having 1 or more and 12 or less carbon atoms, a cycloalkyl group, an aryl group, or an aralkyl group.

From the viewpoint of further suppressing the residual potential, $R^{61}$ and $R^{64}$ in General Formula (6) each independently represent, for example, preferably an alkyl group having 3 or more and 12 or less carbon atoms, an alkoxy group having 3 or more and 12 or less carbon atoms, a cycloalkyl group, an aryl group, or an aralkyl group, more preferably a branched alkyl group having 3 or more and 12 or less carbon atoms, a branched alkoxy group having 3 or more and 12 or less carbon atoms, a cycloalkyl group, an aryl group, or an aralkyl group, still more preferably a branched alkyl group having 3 or more and 8 or less carbon atoms or a branched alkoxy group having 3 or more and 8 or less carbon atoms, and particularly preferably a t-butyl group.

From the viewpoint of further suppressing the residual potential, $R^{62}$ and $R^{64}$ in General Formula (6) each independently represent, for example, preferably a hydrogen atom, an alkyl group having 1 or more and 8 or less carbon atoms, or an alkoxy group having 1 or more and 8 or less carbon atoms, more preferably a hydrogen atom, a linear alkyl group having 1 or more and 4 or less carbon atoms, or a linear alkoxy group having 1 or more and 4 or less carbon atoms, still more preferably a linear alkyl group having 1 or more and 3 or less carbon atoms or a linear alkoxy group having 1 or more and 3 or less carbon atoms, and particularly preferably a methyl group.

In General Formula (6), it is preferable that $R^{61}$ and $R^{64}$ represent, for example, the same group.

In General Formula (6), it is preferable that $R^{62}$ and $R^{63}$ represent, for example, the same group.

In General Formula (6), it is preferable that $R^{61}$ and $R^{62}$ represent, for example, different groups.

In General Formula (6), it is preferable that $R^{63}$ and $R^{64}$ represent, for example, different groups.

Hereinafter, exemplary compounds of the compound represented by General Formula (6) will be shown, but the present exemplary embodiment is not limited thereto. Further, the following exemplary compound numbers will be referred to as exemplary compounds (6-numbers) below. Specifically, for example, an exemplary compound 5 will be referred to as "exemplary compound (6-5)".

| Exemplary comound | $R^{61}$ | $R^{62}$ | $R^{63}$ | $R^{64}$ |
|---|---|---|---|---|
| 1 | $-t-C_4H_9$ | $—CH_3$ | $—CH_3$ | $-t-C_4H_9$ |
| 2 | $-t-C_4H_9$ | H | H | $-t-C_4H_9$ |
| 3 | $-t-C_4H_9$ | $—OCH_3$ | $—OCH_3$ | $-t-C_4H_9$ |
| 4 | $-t-C_4H_9O$ | $—CH_3$ | $—CH_3$ | $-t-C_4H_9O$ |
| 5 | $-c-C_6H_{11}$ | $—CH_3$ | $—CH_3$ | $-c-C_6H_{11}$ |
| 6 | $—C_6H_5$ | $—CH_3$ | $—CH_3$ | $—C_6H_5$ |
| 7 | $—CH_2C_6H_6$ | $—CH_3$ | $—CH_3$ | $—CH_2C_6H_5$ |

Further, the abbreviations and the like in the above-described exemplary compounds have the following meanings.

$t-C_4H_9$: t-butyl group $OCH_3$: methoxy group $t-C_4H_9O$: t-butoxy group $c-C_6H_{11}$: cyclohexyl group $C_6H_5$: phenyl group $CH_2C_6H_5$: benzyl group Compound Represented by General Formula (7)

Hereinafter, the compound represented by General Formula (7) will be described.

General Formula (7)

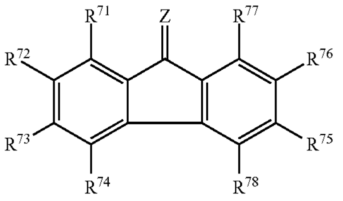

In General Formula (7), $R^{71}$, $R^{72}$, $R^{73}$, $R^{74}$, $R^{75}$, $R^{76}$, $R^{77}$, and $R^{78}$ (hereinafter, also referred to as "$R^{71}$ to $R^{78}$") each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$).

In General Formula (7), examples of the alkyl group represented by $R^{71}$ to $R^{78}$ include a linear or branched alkyl group having 1 or more and 4 or less carbon atoms (for example, preferably 1 or more and 3 or less carbon atoms), and specific examples thereof include a methyl group, an ethyl group, an n-propyl group, an isopropyl group, an n-butyl group, and an isobutyl group.

In General Formula (7), examples of the alkoxy group represented by $R^{71}$ to $R^{78}$ include an alkoxy group having 1 or more and 4 or less carbon atoms (for example, preferably 1 or more and 3 or less), and specific examples thereof include a methoxy group, an ethoxy group, a propoxy group, and a butoxy group.

In General Formula (7), examples of the aralkyl group represented by $R^{71}$ to $R^{78}$ include a group represented by -L-Ar. Here, L represents an alkylene group, and Ar represents an aryl group.

Examples of the alkylene group represented by L include a linear or branched alkylene group having 1 or more and 12 or less carbon atoms, and examples thereof include a methylene group, an ethylene group, an n-propylene group, an isopropylene group, an n-butylene group, an isobutylene group, a sec-butylene group, a tert-butylene group, an n-pentylene group, an isopentylene group, a neopentylene group, and a tert-pentylene group.

Examples of the aryl group represented by Ar include a phenyl group, a methylphenyl group, a dimethylphenyl group, and an ethylphenyl group.

Specific examples of the aralkyl group represented by $R^{71}$ to $R^{78}$ in General Formula (7) include a benzyl group, a methylbenzyl group, a dimethylbenzyl group, a phenylethyl group, a methylphenylethyl group, a phenylpropyl group, and a phenylbutyl group.

Examples of the aryl group represented by $R^{71}$ to $R^{78}$ in General Formula (7) include a phenyl group, a methylphenyl group, a dimethylphenyl group, and an ethylphenyl group. Among these, for example, a phenyl group is preferable.

Examples of the acyl group represented by $R^{71}$ to $R^{78}$ in General Formula (7) ($—C(=O)—R^{AC}$, $R^{AC}$ represents a hydrocarbon group) include an acyl group having 1 or more and 10 or less carbon atoms (for example, preferably 1 or more and 6 or less carbon atoms and more preferably 1 or more and 3 or less carbon atoms), and specific examples thereof include an acetyl group, a propanoyl group, a benzoyl group, and a cyclohexanecarbonyl group.

Examples of the alkoxycarbonyl group represented by $R^{71}$ to $R^{78}$ in General Formula (7) include the same groups as the groups for the alkoxycarbonyl group represented by $R^{11}$ to $R^{18}$ in General Formula (1).

The alkyl group, the alkoxy group, the aralkyl group, the aryl group, and the alkoxycarbonyl group represented by $R^{71}$ and $R^{78}$ in General Formula (7) may have the same substituents as the substituents for the alkyl group, the alkoxy group, the aralkyl group, the aryl group, and the alkoxycarbonyl group represented by $R^{11}$ to $R^{18}$ in General Formula (1).

The acyl group represented by $R^{71}$ and $R^{78}$ in General Formula (7) may have the same substituents as the substituents for the alkyl group represented by $R^{11}$ to $R^{18}$ in General Formula (1).

Examples of the halogen atom represented by $R^{71}$ and $R^{78}$ in General Formula (7) include a fluorine atom, a chlorine atom, a bromine atom, and an iodine atom.

It is preferable that the group represented by $R^{78}$ in General Formula (7) represents, for example, an alkoxycarbonyl group (—C(═O)—O—$R^{78A}$) from the viewpoint of further suppressing the residual potential. $R^{78A}$ represents an alkyl group having 8 or more carbon atoms (long-chain alkyl group) or -$L^{181}$-O—$R^{182}$, $L^{181}$ represents an alkylene group, and $R^{182}$ represents an alkyl group having 8 or more carbon atoms (long-chain alkyl group).

In the group represented by -$L^{181}$-O—$R^{182}$ represented by $R^{78}$ in General Formula (7), $L^{18}1$ represents an alkylene group, and $R^{182}$ represents an alkyl group having 8 or more carbon atoms (long-chain alkyl group).

Examples of the alkylene group represented by $L^{181}$ include a linear or branched alkylene group having 1 or more and 12 or less carbon atoms, and examples of such an alkylene group include a methylene group, an ethylene group, an n-propylene group, an isopropylene group, an n-butylene group, an isobutylene group, a sec-butylene group, a tert-butylene group, an n-pentylene group, an isopentylene group, a neopentylene group, and a tert-pentylene group.

The long-chain alkyl group represented by $R^{182}$ is not particularly limited as long as the long-chain alkyl group has 8 or more carbon atoms, and the number of carbon atoms is, for example, preferably 8 or more and 12 or less from the viewpoint of suppressing cracking of the photosensitive layer. Further, the long-chain alkyl group may be linear or branched and is, for example, preferably linear.

Examples of the linear alkyl group having 8 or more and 12 or less carbon atoms include an n-octyl group, an n-nonyl group, an n-decyl group, an n-undecyl group, and an n-dodecyl group.

Examples of the branched alkyl group having 8 or more and 12 or less carbon atoms include an isooctyl group, a sec-octyl group, a tert-octyl group, an isononyl group, a sec-nonyl group, a tert-nonyl group, an isodecyl group, a sec-decyl group, and a tert-decyl group.

The compound represented by General Formula (7) may contain only one or two or more long-chain alkyl groups in a molecule. From the viewpoint of suppressing cracking of the photosensitive layer, the number of long-chain alkyl groups contained in one molecule of the compound represented by General Formula (7) is, for example, preferably 1 or more and 3 or less and more preferably 1 or more and 2 or less.

In one aspect, from the viewpoint of further suppressing the residual potential, it is preferable that the compound represented by General Formula (7) is, for example, a compound in which $R^{71}$ to $R^{77}$ each independently represent a hydrogen atom, a halogen atom, or an alkyl group and $R^{78}$ represents a linear alkyl group having 8 or less carbon atoms.

Exemplary compounds of the compound represented by General Formula (7) are shown below, but the present exemplary embodiment is not limited thereto. Further, the following exemplary compound numbers will be referred to as exemplary compounds (7-numbers) below. Specifically, for example, an exemplary compound 5 will be referred to as "exemplary compound (7-5)".

| Exemplary compound | $R^{71}$ | $R^{72}$ | $R^{73}$ | $R^{74}$ | $R^{75}$ | $R^{76}$ | $R^{77}$ | $R^{78}$ | Z |
|---|---|---|---|---|---|---|---|---|---|
| 1 | H | H | H | H | H | H | H | —C(═O)—O—$CH_3$ | ═C(CN)$_2$ |
| 2 | H | H | H | H | H | H | H | —C(═O)—O—$C_2H_5$ | ═C(CN)$_2$ |
| 3 | H | H | H | H | H | H | H | —C(═O)—O—n—$C_4H_9$ | ═C(CN)$_2$ |
| 4 | H | H | H | H | H | H | H | —C(═O)—O—t—$C_4H_9$ | ═C(CN)$_2$ |
| 5 | H | H | H | H | H | H | H | —C(═O)—O—n—$C_8H_{17}$ | ═C(CN)$_2$ |
| 6 | H | H | H | H | H | H | H | —C(═O)—O—n—$CH_2$—CH($C_2H_5$)—$C_4H_9$ | ═C(CN)$_2$ |
| 7 | H | H | H | H | H | H | H | —C(═O)—O—n—$C_4H_9$ | O |
| 8 | H | H | H | H | H | H | H | —C(═O)—O—n—$CH_2$—CH($C_2H_5$)—$C_4H_9$ | O |

Further, the abbreviations and the like in the above-described exemplary compounds have the following meanings.

═C(CN)$_2$: dicyanomethylene group

Compound Represented by General Formula (8)

Hereinafter, the compound represented by General Formula (8) will be described.

General Formula (8)

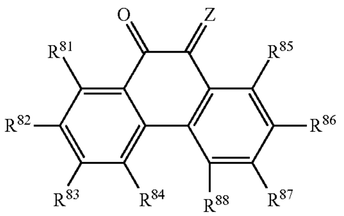

In General Formula (8), $R^{81}$, $R^{82}$, $R^{83}$, $R^{84}$, $R^{85}$, $R^{86}$, $R^{87}$, and $R^{88}$ (hereinafter, also simply referred to as "$R^{81}$ to $R^{88}$") each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group (=C(CN)$_2$)).

Examples of the alkyl group, the alkoxy group, the aralkyl group, the aryl group, the acyl group, the alkoxycarbonyl group, and the halogen atom represented by $R^{81}$ to $R^{88}$ in General Formula (8) include the same groups as the groups for the alkyl group, the alkoxy group, the aralkyl group, the aryl group, the acyl group, the alkoxycarbonyl group, and the halogen atom represented by $R^{71}$ to $R^{78}$ in General Formula (7).

The alkyl group, the alkoxy group, the aralkyl group, the aryl group, and the alkoxycarbonyl group represented by $R^{81}$ to $R^{88}$ in General Formula (8) may have the same substituents as the substituents for the alkyl group, the alkoxy group, the aralkyl group, the aryl group, and the alkoxycarbonyl group represented by $R^{11}$ to $R^{18}$ in General Formula (1).

The acyl group represented by $R^{81}$ to $R^{88}$ in General Formula (8) may have the same substituents as the substituents for the alkyl group represented by $R^{11}$ to $R^{18}$ in General Formula (1).

Exemplary compounds of the compound represented by General Formula (8) are shown below, but the present exemplary embodiment is not limited thereto. Further, the following exemplary compound numbers will be referred to as exemplary compounds (8-numbers) below. Specifically, for example, an exemplary compound 5 will be referred to as "exemplary compound (8-5)".

| Exemplary compound | $R^{81}$ | $R^{82}$ | $R^{83}$ | $R^{84}$ | $R^{85}$ | $R^{86}$ | $R^{87}$ | Z |
|---|---|---|---|---|---|---|---|---|
| 1 | H | H | H | H | H | H | H | O |
| 2 | H | -Br | H | H | H | H | H | O |
| 3 | H | H | -Br | H | H | H | -Br | O |
| 4 | H | —CN | H | H | H | H | H | O |
| 5 | $—CH_3$ | H | H | H | H | H | H | O |
| 6 | H | $—OCH_3$ | H | H | H | H | H | O |
| 7 | $—CH_2CH_3$ | H | H | H | H | $—CH_3$ | H | O |
| 8 | H | H | $—C(=O)CH_3$ | H | H | H | H | O |
| 9 | H | H | H | H | H | H | H | $=C(CN)_2$ |
| 10 | $—CH_3$ | H | H | H | H | $—CH_3$ | H | $=C(CN)_2$ |

Further, the abbreviations and the like in the above-described exemplary compounds have the following meanings.

$C(=O)CH_3$: acetyl group $OCH_3$: methoxy group

CN: cyano group $CH_2C_6H_5$: benzyl group $=C(CN)_2$: dicyanomethylene group

The content of the electron transport material is, for example, preferably 60% by mass or greater and 80% by mass or less, more preferably 65% by mass or greater and 75% by mass, and still more preferably 68% by mass or greater and 72% by mass or less with respect to the total amount of all the binder resin components and the electron transport material of the undercoat layer. In a case where the content of the electron transport material is 60% by mass or greater, the electron transportability of the undercoat layer is likely to be ensured, and $E_{F1}-E_{LUMO1}$ is easily adjusted to be in the above-described ranges. In a case where the content of the electron transport material is 80% by mass or less, the electron transport material in the undercoat layer is likely to be dispersed with high uniformity, and for example, $E_{F1}-E_{LUMO1}$ is easily adjusted to be in the above-described preferable ranges.

The undercoat layer may further contain inorganic particles.

Examples of the inorganic particles include inorganic particles having a powder resistance (volume resistivity) of $10^2$ Ω·cm or greater and $10^{11}$ Ω·cm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater. In a case where the specific surface area thereof is 10 $m^2/g$ or greater, degradation of the charging properties tends to be suppressed.

The volume average particle diameter of the inorganic particles may be, for example, 50 nm or greater and 2,000 nm or less (for example, preferably 60 nm or greater and 1,000 nm or less).

The content of the inorganic particles is, for example, preferably 0% by mass or greater and 80% by mass or less and more preferably 0% by mass or greater and 70% by mass or less with respect to the total solid content of the undercoat layer.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

The dry method is, for example, a method of attaching the surface treatment agent to the surface of the inorganic particles by directly adding the surface treatment agent to the inorganic particles or adding the surface treatment agent, which has been dissolved in an organic solvent, dropwise to the inorganic particles while stirring the inorganic particles with a mixer having a large shearing force and spraying the mixture together with dry air or nitrogen gas. The surface treatment agent may be added dropwise or sprayed, for example, at a temperature lower than or equal to the boiling point of the solvent. After the dropwise addition or the spraying of the surface treatment agent, the surface treatment agent may be further baked at 100° C. or higher. The baking is not particularly limited as long as the temperature and the time are adjusted such that the electrophotographic characteristics can be obtained.

The wet method is, for example, a method of attaching the surface treatment agent to the surface of inorganic particles by adding the surface treatment agent to the inorganic particles while dispersing the inorganic particles in a solvent by performing stirring or using ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the surface treatment agent is added, and examples thereof include a method of removing the moisture while stirring and heating the moisture in a solvent and a method of removing the moisture by azeotropically boiling the moisture with a solvent.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater. The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles when preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The film thickness of the undercoat layer is set to be, for example, preferably in a range of 15 μm or greater and more preferably in a range of 20 μm or greater and 50 μm or less.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $10^{13}$ Ω·cm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. Further, in a case where incoherent light is used as a light source, roughening of the surface to prevent interference fringes is not particularly necessary, and it is appropriate for longer life because occurrence of defects due to the roughness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the micropores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by dipping the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Interlayer

Although not shown in the figures, an interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical methods such as a dip coating method, a push-up coating method, a wire bar coating method, a spray coating method, a blade coating method, an air knife coating method, and a curtain coating method.

The film thickness of the interlayer is set to be, for example, preferably in a range of 0.1 μm or greater and 3 μm or less. Further, the interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is, for example, preferable in a case where an incoherent light source such as a light emitting diode (LED) or an organic electro-luminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine; chlorogallium phthalocyanine; dichlorotin phthalocyanine; and titanyl phthalocyanine are more preferable.

On the other hand, for example, a fused ring aromatic pigment such as dibromoanthanthrone; a thioindigo-based pigment; a porphyrazine compound; zinc oxide; trigonal selenium; or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used.

Meanwhile, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer. Further, the n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $10^{13}$ Ω·cm or greater.

These binder resins may be used alone or in the form of a mixture of two or more kinds thereof.

Further, the blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. Further, the charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type high-pressure homogenizer in which a dispersion liquid is dispersed by a liquid-liquid collision or a liquid-wall collision in a high-pressure state, and a penetration type high-pressure homogenizer in which a dispersion liquid is dispersed by causing the liquid to penetrate through a micro-flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The film thickness of the charge generation layer is set to be, for example, preferably in a range of 0.1 μm or greater and 5.0 μm or less and more preferably in a range of 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

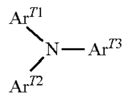

In Structural Formula (a-1), $Ar^{T1}$, $Ar^{T2}$, and $Ar^{T3}$ each independently represent a substituted or unsubstituted aryl group, $—C_6H_4—C(R^{T4})═C(R^{T5})(R^{T6})$, or $—C_6H_4—CH═CH—CH═C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

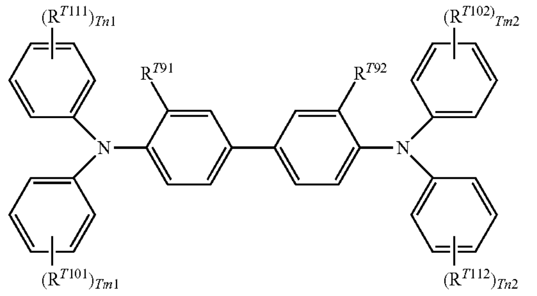

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, an amino group substituted with an alkyl group having 1 or more and 2 or less carbon atoms, a substituted or unsubstituted aryl group, $—C(R^{T12})═C(R^{T13})(R^{T14})$, or $—CH═CH—CH═C(R^{T15})(R^{T16})$, and $R^{T12}$, $R^{T13}$, $R^{T14}$, $R^{T15}$ and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "$—C_6H_4—CH═CH—CH═C(R^{T7})(R^{T8})$" and a benzidine derivative having "$—CH═CH—CH═C(R^{T15})(R^{T16})$" are particularly preferable from the viewpoint of the charge mobility.

As the polymer charge transport material, known materials having charge transport properties, such as poly-N-vinylcarbazole and polysilane, can be used. Particularly, for example, a polyester-based polymer charge transport material is particularly preferable. Further, the polymer charge transport material may be used alone or in combination of binder resins.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, for example, a polycarbonate resin or a polyarylate resin is preferable as the binder resin. These binder resins may be used alone or in combination of two or more kinds thereof.

Further, the blending ratio between the charge transport material and the binder resin is, for example, preferably in a range of 10:1 to 1:5 in terms of the mass ratio.

The charge transport layer may also contain other known additives.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The film thickness of the charge transport layer is set to be, for example, preferably in a range of 5 μm or greater and 50 μm or less and more preferably in a range of 10 μm or greater and 30 μm or less.

Protective Layer

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)

2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], $—NH_2$, —SH, —COOH, and $—SiR^{Q1}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a styryl group (vinylphenyl group), an acryloyl group, a methacryloyl group, and a group containing at least one selected from derivatives thereof. Among these, from the viewpoint that the reactivity is excellent, for example, a vinyl group, a styryl group (vinylphenyl group), an acryloyl group, a methacryloyl group, and a group containing at least one selected from derivatives thereof are preferable as the chain polymerizable group.

The charge-transporting skeleton of the reactive group-containing charge transport material is not particularly limited as long as the charge-transporting skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof In addition, the coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, an air knife coating method, and a curtain coating method.

The film thickness of the protective layer is set to be, for example, preferably in a range of 1 μm or greater and 20 μm or less and more preferably in a range of 2 μm or greater and 10 μm or less.

Single Layer Type Photosensitive Layer

The single layer type photosensitive layer (charge generation/charge transport layer) is, for example, a layer containing a charge generation material, a charge transport material, a binder resin, and as necessary, other known additives. Further, these materials are the same as the materials described in the sections of the charge generation layer and the charge transport layer.

Further, the content of the charge generation material in the single layer type photosensitive layer may be, for example, 0.1% by mass or greater and 10% by mass or less and preferably 0.8% by mass or greater and 5% by mass or less with respect to the total solid content. Further, the content of the charge transport material in the single layer type photosensitive layer may be, for example, 5% by mass or greater and 50% by mass or less with respect to the total solid content.

The method of forming the single layer type photosensitive layer is the same as the method of forming the charge generation layer or the charge transport layer.

The film thickness of the single layer type photosensitive layer may be, for example, 5 m or greater and 50 μm or less and preferably 10 μm or greater and 40 μm or less.

Image Forming Apparatus (and Process Cartridge)

The image forming apparatus according to the present exemplary embodiment is an image forming apparatus including an electrophotographic photoreceptor, a charging device that charges a surface of the electrophotographic photoreceptor, an electrostatic latent image forming device that forms an electrostatic latent image on the charged surface of the electrophotographic photoreceptor, a developing device that develops the electrostatic latent image formed on the surface of the electrophotographic photoreceptor with a developer containing a toner to form a toner image, and a transfer device that transfers the toner image to a surface of a recording medium, in which the moving time of the outer peripheral surface of the electrophotographic photoreceptor, required from charging performed by the charging device to development performed by the developing device, is 90 msec or longer.

As the image forming apparatus according to the present exemplary embodiment, known image forming apparatuses such as an apparatus including a fixing unit that fixes the toner image transferred to the surface of a recording medium; a direct transfer type apparatus that transfers the toner image formed on the surface of the electrophotographic photoreceptor directly to the recording medium; an intermediate transfer type apparatus that primarily transfers the toner image formed on the surface of the electrophotographic photoreceptor to the surface of the intermediate transfer member and secondarily transfers the toner image transferred to the surface of the intermediate transfer member to the surface of the recording medium; an apparatus including a cleaning unit that cleans the surface of the electrophotographic photoreceptor after the transfer of the toner image and before the charging; an apparatus including a charge erasing unit that erases the charges on the surface of the electrophotographic photoreceptor by applying the charge erasing light to the surface after the transfer of the toner image and before the charging; and an apparatus including an electrophotographic photoreceptor heating member for increasing the temperature of the electrophotographic photoreceptor and decreasing the relative temperature are employed.

In a case of the intermediate transfer type apparatus, the transfer unit is, for example, configured to include an intermediate transfer member having a surface onto which the toner image is transferred, a primary transfer unit primarily transferring the toner image formed on the surface of the electrophotographic photoreceptor to the surface of the intermediate transfer member, and a secondary transfer unit secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

Further, in the image forming apparatus according to the present exemplary embodiment, for example, the portion including the electrophotographic photoreceptor may have a cartridge structure (process cartridge) that is attachable to and detachable from the image forming apparatus. As the process cartridge, for example, a process cartridge including the electrophotographic photoreceptor according to the present exemplary embodiment is preferably used. Further, the process cartridge may include, for example, at least one selected from the group consisting of a charging unit, an electrostatic latent image forming unit, a developing unit, and a transfer unit in addition to the electrophotographic photoreceptor.

Hereinafter, an example of the image forming apparatus according to the present exemplary embodiment will be described, but the present exemplary embodiment is not limited thereto. Further, main parts shown in the figures will be described, but description of other parts will not be provided.

FIG. 2 is a schematic configuration view showing an example of the image forming apparatus according to the present exemplary embodiment.

As shown in FIG. 2, an image forming apparatus 100 according to the present exemplary embodiment includes a process cartridge 300 including an electrophotographic photoreceptor 7, an exposure device 9 (an example of an electrostatic latent image forming unit), a transfer device 40 (primary transfer device), and an intermediate transfer member 50. Further, in the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording medium (for example, paper). Further, the intermediate transfer member 50, the transfer device 40 (primary transfer device), and the secondary transfer device (not shown) correspond to an example of the transfer unit.

The process cartridge 300 in FIG. 2 integrally supports the electrophotographic photoreceptor 7, a charging device 8 (an example of the charging unit), a developing device 11 (an example of the developing unit), and a cleaning device 13 (an example of the cleaning unit) in a housing. The cleaning device 13 has a cleaning blade (an example of the cleaning member) 131, and the cleaning blade 131 is disposed to come into contact with the surface of the electrophotographic photoreceptor 7. Further, the cleaning member may be a conductive or insulating fibrous member instead of the aspect of the cleaning blade 131, and may be used alone or in combination with the cleaning blade 131.

Further, FIG. 2 shows an example of an image forming apparatus including a fibrous member 132 (roll shape) that supplies a lubricant 14 to the surface of the electrophotographic photoreceptor 7 and a fibrous member 133 (flat brush shape) that assists cleaning, but these are disposed as necessary.

Hereinafter, each configuration of the image forming apparatus according to the present exemplary embodiment will be described.

Charging Device

As the charging device 8, for example, a contact-type charger formed of a conductive or semi-conductive charging roller, a charging brush, a charging film, a charging rubber blade, a charging tube, or the like is used. Further, a known charger such as a non-contact type roller charger, or a scorotron charger or a corotron charger using corona discharge is also used.

Exposure Device

Examples of the exposure device 9 include an optical system device that exposes the surface of the electrophotographic photoreceptor 7 to light such as a semiconductor laser beam, LED light, and liquid crystal shutter light in a predetermined image pattern. The wavelength of the light source is within the spectral sensitivity region of the electrophotographic photoreceptor. As the wavelength of a semiconductor laser, near infrared, which has an oscillation wavelength in the vicinity of 780 nm, is mostly used. However, the wavelength is not limited thereto, and a laser having an oscillation wavelength of an approximately 600 nm level or a laser having an oscillation wavelength of 400 nm or greater and 450 nm or less as a blue laser may also be used. Further, a surface emission type laser light source capable of outputting a multi-beam is also effective for forming a color image.

Developing Device

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the electrophotographic photoreceptor 7 using a brush, a roller, or the like. Among these, for example, a developing device formed of a developing roller having a surface on which a developer is held is preferably used.

The developer used in the developing device 11 may be a one-component developer containing only a toner or a two-component developer containing a toner and a carrier. Further, the developer may be magnetic or non-magnetic. Known developers are employed as these developers.

Cleaning Device

As the cleaning device 13, a cleaning blade type device including the cleaning blade 131 is used.

In addition to the cleaning blade type device, a fur brush cleaning type device or a simultaneous development cleaning type device may be employed.

Transfer Device

Examples of the transfer device 40 include a known transfer charger such as a contact type transfer charger using a belt, a roller, a film, or a rubber blade, and a scorotron transfer charger or a corotron transfer charger using corona discharge.

Intermediate Transfer Member

As the intermediate transfer member 50, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Figure 3:
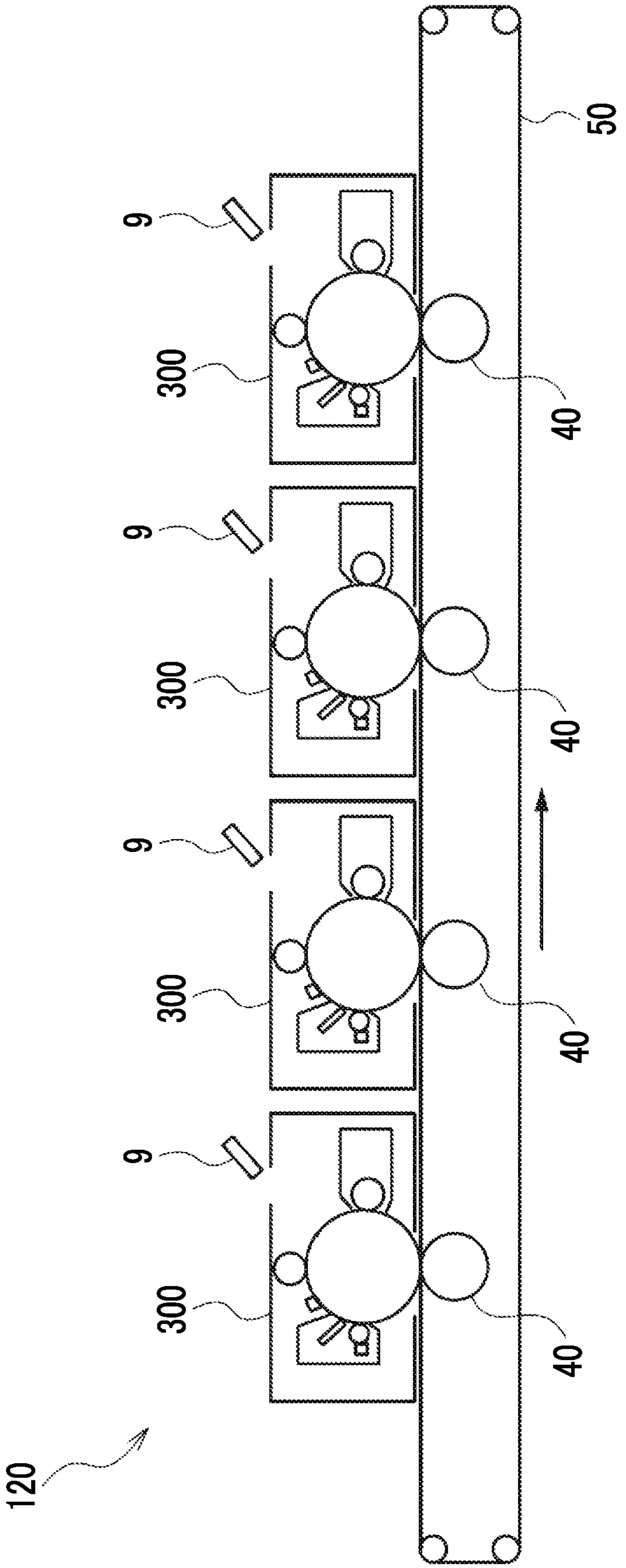
FIG. 3 is a schematic configuration view showing another example of the image forming apparatus according to the present exemplary embodiment.

FIG. 3 is a schematic configuration view showing another example of the image forming apparatus according to the present exemplary embodiment.

An image forming apparatus 120 shown in FIG. 3 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. Further, the image forming apparatus 120 has the same configuration as the image forming apparatus 100 except that the image forming apparatus 120 is of a tandem type.

EXAMPLES

Hereinafter, the electrophotographic photoreceptor of the present disclosure will be described in more detail with reference to examples. The materials, the used amounts, the ratios, the treatment procedures, and the like described in the following examples may be appropriately changed without departing from the spirit of the present disclosure. Therefore, the scope of the electrophotographic photoreceptor of the present disclosure should not be limitatively interpreted by the specific examples described below.

In the following description, "parts" and "%" are on a mass basis unless otherwise specified.

In the following description, the synthesis, the production, the treatment, the measurement, and the like are carried out at room temperature (25° C.±3° C.) unless otherwise specified.

Preparation of Electron Transport Material

Preparation of Electron Transport Material (1)

6.4 g of an exemplary compound (1-1) represented by General Formula (1), 72 g of zirconia beads having a diameter of 0.3 mm, and 1.0 g of sodium chloride are added to a container made of zirconia, and the mixture is pulverized at a rotation speed of 500 rpm for 2 hours using a planetary mill device (P-7 Classic Line, manufactured by Fritsch). After the pulverization, the pigment particles are separated by filtration while the zirconia beads are washed with 500 ml of distilled water. The obtained aqueous dispersion liquid of the pigment particles is centrifuged, and the supernatant water is removed by decantation to isolate the pigment. The isolated pigment is repeatedly washed with water until the electrical conductivity reaches 10 S/cm or less and dried in a freeze dryer for 48 hours. The dried pigment particles are classified by a 1000-mesh sieve, and the coarse particles are removed, thereby obtaining an electron transport material (1).

Preparation of Electron Transport Material (2)

An electron transport material (2) is prepared in the same manner as that for the electron transport material (1) except that the classification operation is not performed in the method of preparing the electron transport material (1).

Preparation of Electron Transport Material (3)

An electron transport material (3) is prepared in the same manner as that for the electron transport material (1) except that a mixture of the compound (1-1) of the electron transport material (1) and zinc oxide (manufactured by Tayca Corporation, average particle diameter of 70 nm, specific surface area of 15 $m^2/g$) at a mixing ratio of 9:1 is used.

Preparation of Electron Transport Material (4)

100 parts of zinc oxide (manufactured by Tayca Corporation, average particle diameter of 70 nm, specific surface area of 15 $m^2/g$) is stirred and mixed with 500 parts of tetrahydrofuran, 1.4 parts of a silane coupling agent (KBE503, manufactured by Shin-Etsu Chemical Co., Ltd.) is added thereto, and the mixture is stirred for 2 hours. Thereafter, toluene is distilled off by vacuum distillation and baked at 120° C. for 3 hours, thereby obtaining zinc oxide surface-treated with a silane coupling agent.

110 parts of the surface-treated zinc oxide is stirred and mixed with 500 parts of tetrahydrofuran, a solution in which 0.6 parts of alizarin is dissolved in 50 parts of tetrahydrofuran is added thereto, and the mixture is stirred at 50° C. for 5 hours. Thereafter, zinc oxide to which alizarin is added is filtered off by vacuum filtration, and further dried under reduced pressure at 60° C. to obtain zinc oxide to which alizarin is added.

Example 1

Formation of Undercoat Layer 1

60 parts of the electron transport material (1) as the electron transport material, 13.5 parts of a curing agent (SUMIDUR 3175, manufactured by Sumitomo Bayer Urethane Co., Ltd., blocked isocyanate, content of curing agent: 75% by mass), 15 parts by a butyral resin (S-LEC BM-1, manufactured by Sekisui Chemical Co., Ltd.), and 85 parts of methyl ethyl ketone are mixed to obtain a mixed solution. 38 parts of this mixed solution and 25 parts of methyl ethyl ketone are mixed and dispersed for 2 hours in a sand mill using glass beads having a diameter of 1 mmφ, thereby obtaining a dispersion liquid.

0.005 parts of dioctyltin dilaurate as a catalyst and 30 parts of silicone resin particles (TOSPEARL 145, manufactured by Momentive Performance Materials Inc.) are added to the obtained dispersion liquid, thereby obtaining a coating solution for an undercoat layer. A cylindrical aluminum base material is coated with the coating solution by a dip coating method, and dried and cured at 170° C. for 30 minutes, thereby obtaining an undercoat layer having a film thickness of 25 μm.

Formation of Charge Generation Layer 1 part of hydroxygallium phthalocyanine having diffraction peaks at least at positions where Bragg angles (2θ±0.5°) of the X-ray diffraction spectrum using Cukα characteristic X-rays are 7.8° and 28.6° is mixed with 1 part of polyvinyl butyral (S-LEC BM-5, manufactured by Sekisui Chemical Co., Ltd.) and 80 parts of n-butyl acetate, and the mixture is subjected to a dispersion treatment for 1 hour using a paint shaker together with glass beads, thereby preparing a coating solution for a charge generation layer. A conductive substrate on which the undercoat layer is formed is dipped in and coated with the obtained coating solution, and heated and dried at 130° C. for 10 minutes, thereby forming a charge generation layer having a film thickness of 0.15 μm.

Formation of Charge Transport Layer 45 parts of a benzidine compound represented by Formula (CTM1) as a charge transport material and 55 parts of a polymer compound (viscosity average molecular weight: 40,000) having a repeating unit represented by Formula (PCZ1) as a binder resin are dissolved in 350 parts of toluene and 150 parts of tetrahydrofuran, and 8 parts of an ethylene tetrafluoride resin (LUBRON L5, manufactured by Daikin Industries, Ltd., average particle diameter of 300 nm) is added thereto. Further, 100 ppm of KP340 (manufactured by Shin-Etsu Chemical Co., Ltd.) is added to the coating solution, and the solution is treated with a high-pressure homogenizer 5 times, thereby preparing a coating solution for a charge transport layer.

The charge generation layer is coated with the obtained coating solution by a dip coating method and heated at 130° C. for 45 minutes, thereby forming a charge transport layer having a film thickness of 40 m. An electrophotographic photoreceptor of Example 1 is obtained by performing the above-described treatment.

(PCZ1)

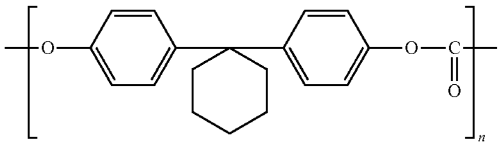

(CTM1)

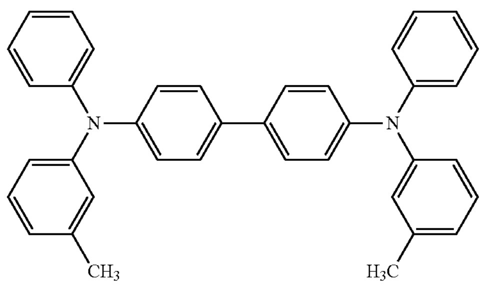

Preparation of Image Forming Apparatus

The electrophotographic photoreceptor obtained above is mounted on a drum cartridge of an image forming apparatus DocuCentre C5570 (manufactured by FUJIFILM Business Innovation Corporation), thereby obtaining an image forming apparatus.

Examples 2 to 14 and Comparative Examples 1 to 6

Each electrophotographic photoreceptor of each example is obtained in the same manner as in Example 1 except that the kind of the undercoat layer is changed from the undercoat layer (1) to the kind of the undercoat layer and the kind of the charge generation layer listed in Table 1. Further, in the image forming apparatus, the moving time of the outer peripheral surface of the electrophotographic photoreceptor, which is required from charging performed by the charging device to development performed by the developing device, is set as the specifications listed in Table 1. Further, a method of preparing each undercoat layer and the charge generation layer, which are changed from Example 1, is as follows.

Preparation of Undercoat Layer (2)

An undercoat layer (2) is prepared by the same procedures as the procedures for the undercoat layer (1) except that the electron transport material (2) is used as the electron transport material and the dispersion time using a sand mill is changed to 4 hours.

Preparation of Undercoat Layer (3)

An undercoat layer (3) is prepared by the same procedures as the procedures for the undercoat layer (1) except that the electron transport material (3) is used as the electron transport material.

Preparation of Undercoat Layer (4)

An undercoat layer (4) is prepared by the same procedures as the procedures for the undercoat layer (1) except that the content of the electron transport material is set to 57 parts with respect to the total amount of all the binder resin components and the electron transport material of the undercoat layer.

Preparation of Undercoat Layer (5)

An undercoat layer (5) is prepared by the same procedures as the procedures for the undercoat layer (1) except that the electron transport material (2) is used as the electron transport material.

Preparation of Undercoat Layer (6)

An undercoat layer (6) is prepared by the same procedures as the procedures for the undercoat layer (1) except that the electron transport material (4) is used as the electron transport material and the addition amount is set to 24 parts.

Preparation of Undercoat Layer (7)

An undercoat layer (7) is prepared by the same procedures as the procedures for the undercoat layer (1) except that the content of the electron transport material is set to 83 parts with respect to the total amount of all the binder resin components and the electron transport material of the undercoat layer.

Preparation of Charge Generation Layer (2)

1 part of chlorogallium phthalocyanine having diffraction peaks at least at positions where Bragg angles (2θ±0.5°) of the X-ray diffraction spectrum using Cukα characteristic X-rays are 7.9° and 28.8° is mixed with 1 part of polyvinyl butyral (S-LEC BM-5, manufactured by Sekisui Chemical Co., Ltd.) and 80 parts of n-butyl acetate, and the mixture is subjected to a dispersion treatment for 1 hour using a paint shaker together with glass beads, thereby preparing a coating solution for a charge generation layer. A conductive substrate on which the undercoat layer is formed is dipped in and coated with the obtained coating solution, and heated and dried at 130° C. for 10 minutes, thereby forming a charge generation layer having a film thickness of 0.15 μm.

Reference Example 1

An image forming apparatus is obtained in the same manner as in Example 1 except that the moving time of the outer peripheral surface of the electrophotographic photoreceptor, which is required from charging performed by the charging device to development performed by the developing device, is set as the specifications listed in Table 1 in the image forming device.

Evaluation of Fogging

After printing is performed on 1M sheets in a low-temperature and low-humidity environment (10° C., 5% RH) using the image forming apparatus of each example, occurrence of fogging is visually observed, and the evaluation is performed according to the following evaluation standards. The results are listed in Table 1.

A: Image defects are not found.

B: Minor image defects have occurred at an acceptable level of quality

C: Image defects have occurred at an acceptable level of quality

D: Image defects have occurred at an unacceptable level of quality

TABLE 1

| | Charge generation layer | | | | Underlayer | | | | Charge transport material | | | | | |
|---|---|---|---|---|---|---|---|---|---|---|---|---|---|---|
| | Type — | $E_{LUMO2}$ eV | $E_{F2}$ eV | $E_{F2}$-$E_{LUMO2}$ eV | Type — | $E_{LUMO1}$ eV | $E_{F1}$ eV | $E_{F1}$-$E_{LUMO1}$ eV | Type — | Average primary particle diameter nm | Aspect ratio — | Content mass % | Moving time msec | Evaluation Fogging |
| Example 1 | 1 | 3.94 | 5.12 | 1.18 | 1 | 3.86 | 4.37 | 0.51 | 1 | 245 | 3.6 | 70 | 100 | A |
| Example 2 | 1 | 3.94 | 5.12 | 1.18 | 1 | 3.86 | 4.37 | 0.51 | 1 | 245 | 3.6 | 70 | 150 | A |
| Example 3 | 1 | 3.94 | 5.12 | 1.18 | 1 | 3.86 | 4.37 | 0.51 | 1 | 245 | 3.6 | 70 | 240 | A |
| Example 4 | 2 | 4.01 | 5.22 | 1.21 | 1 | 3.86 | 4.37 | 0.51 | 1 | 245 | 3.6 | 70 | 100 | A |
| Example 5 | 2 | 4.01 | 5.22 | 1.21 | 1 | 3.86 | 4.37 | 0.51 | 1 | 245 | 3.6 | 70 | 150 | A |
| Example 6 | 2 | 4.01 | 5.22 | 1.21 | 1 | 3.86 | 4.37 | 0.51 | 1 | 245 | 3.6 | 70 | 240 | A |
| Example 7 | 1 | 3.94 | 5.12 | 1.18 | 2 | 3.86 | 4.38 | 0.52 | 2 | 232 | 3.7 | 70 | 100 | A |
| Example 8 | 1 | 3.94 | 5.12 | 1.18 | 2 | 3.86 | 4.38 | 0.52 | 2 | 232 | 3.7 | 70 | 150 | A |
| Example 9 | 1 | 3.94 | 5.12 | 1.18 | 2 | 3.86 | 4.38 | 0.52 | 2 | 232 | 3.7 | 70 | 240 | B |
| Example 10 | 1 | 3.94 | 5.12 | 1.18 | 3 | 3.84 | 4.41 | 0.57 | 3 | 187 | 3.3 | 70 | 100 | A |
| Example 11 | 1 | 3.94 | 5.12 | 1.18 | 3 | 3.84 | 4.41 | 0.57 | 3 | 187 | 3.3 | 70 | 150 | B |
| Example 12 | 1 | 3.94 | 5.12 | 1.18 | 3 | 3.84 | 4.41 | 0.57 | 3 | 187 | 3.3 | 70 | 240 | C |
| Example 13 | 1 | 3.94 | 5.12 | 1.18 | 4 | 3.83 | 4.42 | 0.59 | 1 | 252 | 3.6 | 57 | 240 | C |
| Example 14 | 1 | 3.94 | 5.12 | 1.18 | 7 | 3.89 | 4.28 | 0.39 | 1 | 241 | 3.6 | 83 | 240 | C |
| Comparative Example 1 | 1 | 3.94 | 5.12 | 1.18 | 5 | 3.85 | 4.47 | 0.62 | 2 | 212 | 4.8 | 70 | 100 | D |
| Comparative Example 2 | 1 | 3.94 | 5.12 | 1.18 | 5 | 3.85 | 4.47 | 0.62 | 2 | 212 | 4.8 | 70 | 150 | D |
| Comparative Example 3 | 1 | 3.94 | 5.12 | 1.18 | 5 | 3.85 | 4.47 | 0.62 | 2 | 212 | 4.8 | 70 | 240 | D |
| Comparative Example 4 | 1 | 3.94 | 5.12 | 1.18 | 6 | 3.75 | 4.60 | 0.85 | 4 | 72 | 1.7 | 49 | 100 | D |
| Comparative Example 5 | 1 | 3.94 | 5.12 | 1.18 | 6 | 3.75 | 4.60 | 0.85 | 4 | 72 | 1.7 | 49 | 150 | D |
| Comparative Example 6 | 1 | 3.94 | 5.12 | 1.18 | 6 | 3.75 | 4.60 | 0.85 | 4 | 72 | 1.7 | 49 | 240 | D |
| Reference Example 1 | 1 | 3.94 | 5.12 | 1.18 | 6 | 3.75 | 4.60 | 0.85 | 4 | 72 | 1.7 | 49 | 82 | B |

As listed in the table, it is found that the electrophotographic photoreceptors of the examples suppress fogging as compared with the electrophotographic photoreceptors of the comparative examples.

The image forming apparatus according to the present exemplary embodiment includes the following aspects.

(((1))) An image forming apparatus comprising:

an electrophotographic photoreceptor that includes a conductive substrate, an undercoat layer provided on the conductive substrate, containing a binder resin and an electron transport material, and satisfying Expression 1-1, and a photosensitive layer provided on the undercoat layer;

a charging device that charges a surface of the electrophotographic photoreceptor;

an electrostatic latent image forming device that forms an electrostatic latent image on the charged surface of the electrophotographic photoreceptor;

a developing device that develops the electrostatic latent image formed on the surface of the electrophotographic photoreceptor with a developer containing a toner to form a toner image; and a transfer device that transfers the toner image to a surface of a recording medium, in which a moving time of an outer peripheral surface of the electrophotographic photoreceptor, required from charging performed by the charging device to development performed by the developing device, is 90 msec or longer, Expression 1-1: $0.20 \le E_{F1} - E_{LUMO1} \le 0.60$ (in Expression 1-1, $E_{F1}$ represents a Fermi level of the undercoat layer, and $E_{LUMO1}$ represents an energy level of LUMO of the undercoat layer).

(((2))) The image forming apparatus according to (((1))), wherein the undercoat layer further satisfies Expression 1-2, Expression 1-2: $0.40 \le E_{F1} - E_{LUMO1} \le 0.58$ (in Expression 1-2, $E_{LUMO1}$ represents the energy level of LUMO of the undercoat layer, and $E_{F1}$ represents the Fermi level of the undercoat layer).

(((3))) The image forming apparatus according to (((1))) or (((2))), wherein the undercoat layer has a Fermi level EF1 of 4.2 eV or greater and 5.0 eV or less.

(((4))) The image forming apparatus according to (((3))), wherein the undercoat layer has a LUMO energy level $E_{LUMO1}$ of 3.5 eV or greater and 4.2 eV or less.

(((5))) The image forming apparatus according to any one of (((1))) to (((4))), wherein the photosensitive layer is a lamination type photosensitive layer formed of a charge generation layer provided on the undercoat layer and a charge transport layer provided on the charge generation layer, and the charge generation layer satisfies Expression 2-1, Expression 2-1: $0.90 \le E_{F2} - E_{LUMO2} \le 1.40$ (in Expression 2-1, $E_{F2}$ represents a Fermi level of the charge generation layer, and $E_{LUMO2}$ represents an energy level of LUMO of the charge generation layer).

(((6))) The image forming apparatus according to any one of (((1))) to (((5))), wherein the electron transport material has an average primary particle diameter of 80 nm or greater and 400 nm or less.

(((7))) The image forming apparatus according to (((1))), wherein the electron transport material has an aspect ratio of 1.0 or greater and 4.2 or less.

((((8))) The image forming apparatus according to any one of (((1))) to (((7))), wherein the electron transport material is at least one selected from the group consisting of compounds represented by General Formulae (1) to (8), General Formula (1)

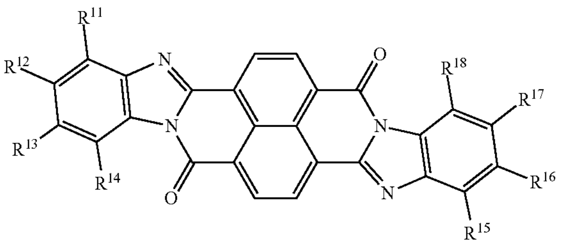

General Formula (2)

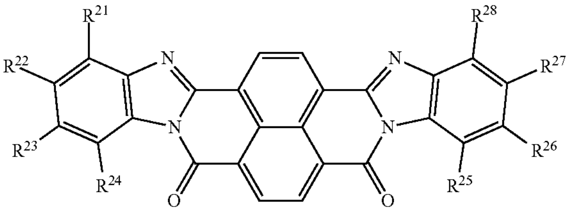

General Formula (3)

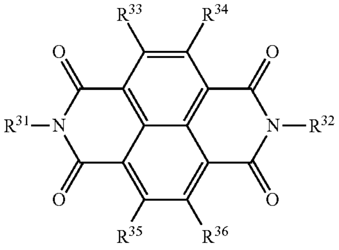

General Formula (4)

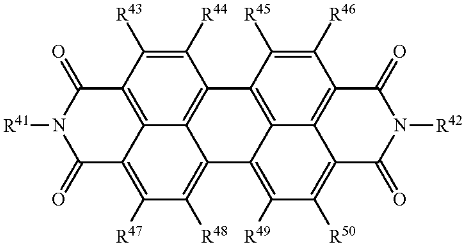

General Formula (5)

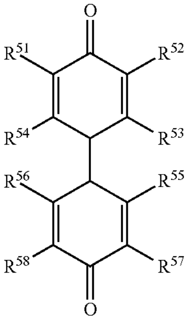

General Formula (6)

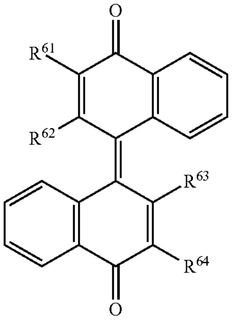

General Formula (7)

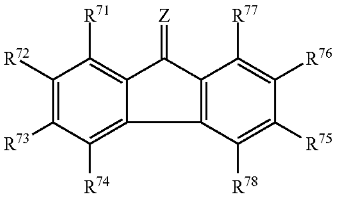

General Formula (8)

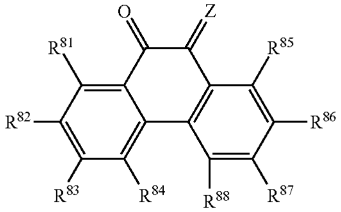

(in General Formula (1), $R^{11}$, $R^{12}$, $R^{13}$, $R^{14}$, $R^{15}$, $R^{16}$, $R^{17}$, and $R^{18}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{11}$ and $R^{12}$, $R^{12}$ and $R^{13}$, and $R^{13}$ and $R^{14}$ may be each independently linked to each other to form a ring, and $R^{15}$ and $R^{16}$, $R^{16}$ and $R^{17}$, and $R^{17}$ and $R^{18}$ may be each independently linked to each other to form a ring, in General Formula (2), $R^{21}$, $R^{22}$, $R^{23}$, $R^{24}$, $R^{25}$, $R^{26}$, $R^{27}$, and $R^{28}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{21}$ and $R^{22}$, $R^{22}$ and $R^{23}$, and $R^{23}$ and $R^{24}$ may be each independently linked to each other to form a ring, and $R^{25}$ and $R^{26}$, $R^{26}$ and $R^{27}$, and $R^{27}$ and $R^{28}$ may be each independently linked to each other to form a ring, in General Formula (3), $R^{31}$, $R^{32}$, $R^{33}$, $R^{34}$, $R^{35}$, and $R^{36}$ each independently represent a hydrogen atom, an alkyl group, an alkoxy group, an aralkyl group, an aryl group, an alkoxycarbonyl group, or a halogen atom, in General Formula (4), $R^{41}$, $R^{42}$, $R^{43}$, $R^{44}$, $R^{45}$, $R^{46}$, $R^{47}$, $R^{48}$, $R^{49}$, and $R^{50}$ each independently represent a hydrogen atom, an alkyl group, an alkoxy group, an aralkyl group, an aryl group, an alkoxycarbonyl group, or a halogen atom, in General Formula (5), $R^{51}$, $R^{52}$, $R^{53}$, $R^{54}$, $R^{55}$, $R^{56}$, $R^{57}$, and $R^{5'}$ each independently represent a hydrogen atom, an alkyl group, an alkoxy group, an aralkyl group, an aryl group, an alkoxycarbonyl group, or a halogen atom, in General Formula (6), $R^{61}$, $R^{62}$, $R^{63}$, and $R^{64}$ each independently represent a hydrogen atom, an alkyl group, an alkoxy group, an aralkyl group, an aryl group, an alkoxycarbonyl group, or a halogen atom, in General Formula (7), $R^{71}$, $R^{72}$, $R^{73}$, $R^{74}$, $R^{75}$, $R^{76}$, $R^{77}$, and $R^{78}$ each independently represent a hydrogen atom, an alkyl group, an alkoxy group, an aralkyl group, an aryl group, an alkoxycarbonyl group, or a halogen atom, and Z represents an oxygen atom or a dicyanomethylene group ($=C(CN)_2$), in General Formula (8), $R^{81}$, $R^{82}$, $R^{83}$, $R^{84}$, $R^{85}$, $R^{86}$, $R^{87}$, and $R^{18}$ each independently represent a hydrogen atom, an alkyl group, an alkoxy group, an aralkyl group, an aryl group, an alkoxycarbonyl group, or a halogen atom, and Z represents an oxygen atom or a dicyanomethylene group ($=C(CN)_2$)).

(((9))) The image forming apparatus according to (((8))), wherein the electron transport material is at least one of compounds represented by General Formulae (1) and (2).

(((10))) The image forming apparatus according to any one of (((1))) to (((9))), wherein a content of the electron transport material is 60% by mass or greater and 80% by mass or less with respect to a total amount of all binder resin components and the electron transport material of the undercoat layer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an electrophotographic photoreceptor that includes a conductive substrate, an undercoat layer provided on the conductive substrate, containing a binder resin and an electron transport material, and satisfying Expression 1-1, and a photosensitive layer provided on the undercoat layer;

a charging device that charges a surface of the electrophotographic photoreceptor;

an electrostatic latent image forming device that forms an electrostatic latent image on the charged surface of the electrophotographic photoreceptor;

a developing device that develops the electrostatic latent image formed on the surface of the electrophotographic photoreceptor with a developer containing a toner to form a toner image; and a transfer device that transfers the toner image to a surface of a recording medium, in which a moving time of an outer peripheral surface of the electrophotographic photoreceptor, required from charging performed by the charging device to development performed by the developing device, is 90 msec or longer, $$0.20 \le E_{F1} - E_{LUMO1} \le 0.60 \quad \text{Expression 1-1:}$$

in Expression 1-1, $E_{F1}$ represents a Fermi level of the undercoat layer, and $E_{LUMO1}$ represents an energy level of LUMO of the undercoat layer.

2. The image forming apparatus according to claim 1, wherein the undercoat layer further satisfies Expression 1-2, $$0.40 \le E_{F1} - E_{LUMO1} \le 0.58 \quad \text{Expression 1-2:}$$

in Expression 1-2, $E_{LUMO1}$ represents the energy level of LUMO of the undercoat layer, and $E_{F1}$ represents the Fermi level of the undercoat layer.

3. The image forming apparatus according to claim 1, wherein the undercoat layer has a Fermi level $E_{F1}$ of 4.2 eV or greater and 5.0 eV or less.

4. The image forming apparatus according to claim 3, wherein the undercoat layer has a LUMO energy level $E_{LUMO1}$ of 3.5 eV or greater and 4.2 eV or less.

5. The image forming apparatus according to claim 1, wherein the photosensitive layer is a lamination type photosensitive layer formed of a charge generation layer provided on the undercoat layer and a charge transport layer provided on the charge generation layer, and the charge generation layer satisfies Expression 2-1, $$0.90 \le E_{F2} - E_{LUMO2} \le 1.40 \quad \text{Expression 2-1:}$$

in Expression 2-1, $E_{F2}$ represents a Fermi level of the charge generation layer, and $E_{LUMO2}$ represents an energy level of LUMO of the charge generation layer.

6. The image forming apparatus according to claim 1, wherein the electron transport material has an average primary particle diameter of 80 nm or greater and 400 nm or less.

7. The image forming apparatus according to claim 1, wherein the electron transport material has an aspect ratio of 1.0 or greater and 4.2 or less.

8. The image forming apparatus according to claim 1, wherein the electron transport material is at least one selected from the group consisting of compounds represented by General Formulae (1) to (8), General Formula (1)

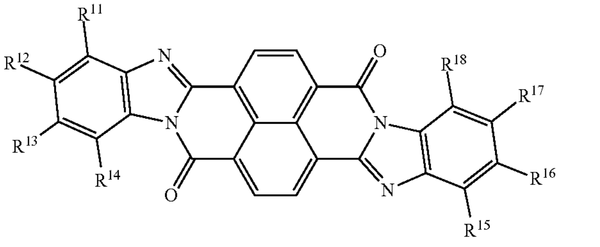

General Formula (2)

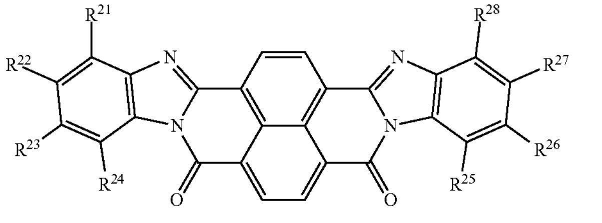

-continued

General Formula (3)

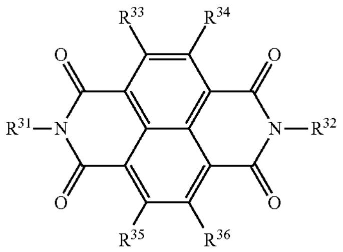

General Formula (4)

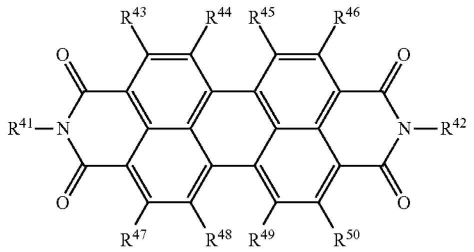

General Formula (5)

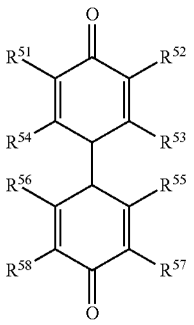

General Formula (6)

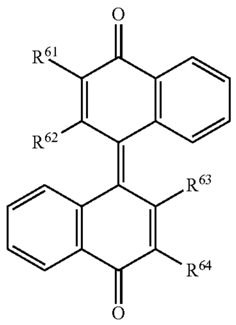

General Formula (7)

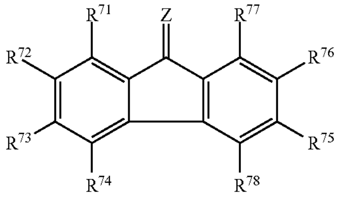

General Formula (8)

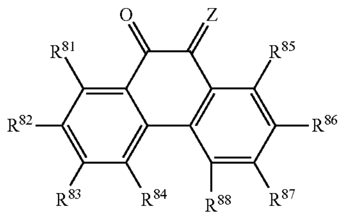

in General Formula (1), $R^{11}$, $R^{12}$, $R^{13}$, $R^{14}$, $R^{15}$, $R^{16}$, $R^{17}$, and $R^{18}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{11}$ and $R^{12}$, $R^{12}$ and $R^{13}$, and $R^{13}$ and $R^{14}$ may be each independently linked to each other to form a ring, and $R^{15}$ and $R^{16}$, $R^{16}$ and $R^{17}$, and $R^{17}$ and $R^{18}$ may be each independently linked to each other to form a ring, in General Formula (2), $R^{21}$, $R^{22}$, $R^{23}$, $R^{24}$, $R^{25}$, $R^{26}$, $R^{27}$, and $R^{28}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{21}$ and $R^{22}$, $R^{22}$ and $R^{23}$, and $R^{23}$ and $R^{24}$ may be each independently linked to each other to form a ring, and $R^{25}$ and $R^{26}$, $R^{26}$ and $R^{27}$, and $R^{27}$ and $R^{28}$ may be each independently linked to each other to form a ring, in General Formula (3), $R^{31}$, $R^{32}$, $R^{33}$, $R^{34}$, $R^{35}$, and $R^{36}$ each independently represent a hydrogen atom, an alkyl group, an alkoxy group, an aralkyl group, an aryl group, an alkoxycarbonyl group, or a halogen atom, in General Formula (4), $R^{41}$, $R^{42}$, $R^{43}$, $R^{44}$, $R^{45}$, $R^{46}$, $R^{47}$, $R^{48}$, $R^{49}$, and $R^{50}$ each independently represent a hydrogen atom, an alkyl group, an alkoxy group, an aralkyl group, an aryl group, an alkoxycarbonyl group, or a halogen atom, in General Formula (5), $R^{51}$, $R^{52}$, $R^{53}$, $R^{54}$, $R^{55}$, $R^{56}$, $R^{57}$, and $R^{5'}$ each independently represent a hydrogen atom, an alkyl group, an alkoxy group, an aralkyl group, an aryl group, an alkoxycarbonyl group, or a halogen atom, in General Formula (6), $R^{61}$, $R^{62}$, $R^{63}$, and $R^{64}$ each independently represent a hydrogen atom, an alkyl group, an alkoxy group, an aralkyl group, an aryl group, an alkoxycarbonyl group, or a halogen atom, in General Formula (7), $R^{71}$, $R^{72}$, $R^{73}$, $R^{74}$, $R^{75}$, $R^{76}$, $R^{77}$, and $R^{78}$ each independently represent a hydrogen atom, an alkyl group, an alkoxy group, an aralkyl group, an aryl group, an alkoxycarbonyl group, or a halogen atom, and Z represents an oxygen atom or a dicyanomethylene group ($=C(CN)_2$), in General Formula (8), $R^{81}$, $R^{82}$, $R^{83}$, $R^{84}$, $R^{85}$, $R^{86}$, $R^{87}$, and $R^{88}$ each independently represent a hydrogen atom, an alkyl group, an alkoxy group, an aralkyl group, an aryl group, an alkoxycarbonyl group, or a halogen atom, and Z represents an oxygen atom or a dicyanomethylene group ($=C(CN)_2$).

9. The image forming apparatus according to claim 8, wherein the electron transport material is at least one of compounds represented by General Formulae (1) and (2).

10. The image forming apparatus according to claim 1, wherein a content of the electron transport material is 60% by mass or greater and 80% by mass or less with respect to a total amount of all binder resin components and the electron transport material of the undercoat layer.

* * * * *